US009635405B2

United States Patent
Zaslavsky et al.

(10) Patent No.: US 9,635,405 B2
(45) Date of Patent: Apr. 25, 2017

(54) SYSTEM AND METHOD FOR SCALABLE, HIGH ACCURACY, SENSOR AND ID BASED AUDIENCE MEASUREMENT SYSTEM BASED ON DISTRIBUTED COMPUTING ARCHITECTURE

(75) Inventors: Eduard Zaslavsky, Issaquah, WA (US); Arthur Vaysman, San Jose, CA (US)

(73) Assignee: WEBTUNER CORP., Redmond, WA (US)

( * ) Notice: Subject to any disclaimer, the term of this patent is extended or adjusted under 35 U.S.C. 154(b) by 180 days.

(21) Appl. No.: 13/474,064

(22) Filed: May 17, 2012

(65) Prior Publication Data
US 2012/0297409 A1 Nov. 22, 2012

Related U.S. Application Data

(60) Provisional application No. 61/486,974, filed on May 17, 2011, provisional application No. 61/490,677, (Continued)

(51) Int. Cl.
*H04N 7/16* (2011.01)
*H04H 60/33* (2008.01)
(Continued)

(52) U.S. Cl.
CPC ...... *H04N 21/25883* (2013.01); *H04H 60/31* (2013.01); *H04H 60/66* (2013.01);
(Continued)

(58) Field of Classification Search
USPC ...................................................... 725/9–36
See application file for complete search history.

(56) References Cited

U.S. PATENT DOCUMENTS 2,958,403 A 11/1960 Robertson et al.
4,264,924 A 4/1981 Freeman
(Continued)

FOREIGN PATENT DOCUMENTS

EP 1193969 4/2002
EP 1193976 4/2002
(Continued)

OTHER PUBLICATIONS

U.S. Appl. No. 13/440,364, Zaslaysky.
(Continued)

*Primary Examiner* — Mushfikh Alam
(74) *Attorney, Agent, or Firm* — Volpe and Koenig, P.C.

(57) ABSTRACT

Dynamic television audience measurement systems (AMS) and methods are disclosed. The system comprises a central level AMS sub-system, a local node level AMS sub-system, a plurality of client level AMS sub-systems, and a plurality of display devices, each monitored by a client level AMS sub-system. The central level AMS sub-system receives panel definitions from panel requestors and transmits the panel definitions to and receives a merged viewership report from the local node level AMS sub-system. The local node level AMS sub-system receives panel definitions from and transmits the merged viewership report to the central level AMS sub-system, transmits the panel definitions to and receives viewership reports from the plurality of client level AMS sub-systems, and merges the viewership reports into the merged viewership report. Each client level AMS sub-systems receives panel definitions from and transmits the viewership report to the local node level AMS sub-system and compiles the viewership report.

48 Claims, 8 Drawing Sheets

Related U.S. Application Data filed on May 27, 2011, provisional application No. 61/491,494, filed on May 31, 2011, provisional application No. 61/492,429, filed on Jun. 2, 2011.

(51) Int. Cl.

| | | |
|---|---|---|
| *H04H 60/45* | (2008.01) | |
| *H04H 60/56* | (2008.01) | |
| *H04N 21/258* | (2011.01) | |
| *H04N 21/442* | (2011.01) | |
| *H04N 21/81* | (2011.01) | |
| *H04H 60/31* | (2008.01) | |
| *H04H 60/66* | (2008.01) | |

(52) U.S. Cl.
CPC ..... *H04N 21/25891* (2013.01); *H04N 21/442* (2013.01); *H04N 21/44222* (2013.01); *H04N 21/812* (2013.01)

(56) References Cited

U.S. PATENT DOCUMENTS

| | | |
|---|---|---|
| 4,332,998 A | 6/1982 | Boros |
| 4,381,522 A | 4/1983 | Lambert |
| 4,426,629 A | 1/1984 | Fouse |
| 4,529,006 A | 7/1985 | Block et al. |
| 4,561,233 A | 12/1985 | Harter et al. |
| 4,580,950 A | 4/1986 | Sumikawa et al. |
| 4,706,121 A | 11/1987 | Young |
| 4,745,549 A | 5/1988 | Hashimoto |
| 4,751,578 A | 6/1988 | Reiter et al. |
| 4,873,073 A | 10/1989 | Matsui |
| 4,977,455 A | 12/1990 | Young |
| 4,982,343 A | 1/1991 | Hourvitz et al. |
| 4,996,642 A | 2/1991 | Hey |
| 5,047,867 A | 9/1991 | Strubbe et al. |
| 5,151,789 A | 9/1992 | Young |
| 5,161,109 A | 11/1992 | Keating et al. |
| 5,179,439 A | 1/1993 | Hashimoto |
| 5,223,924 A | 6/1993 | Strubbe |
| 5,253,275 A | 10/1993 | Yurt et al. |
| 5,307,173 A | 4/1994 | Yuen et al. |
| 5,323,240 A | 6/1994 | Amano et al. |
| 5,343,665 A | 9/1994 | Palmersten |
| 5,347,632 A | 9/1994 | Filepp et al. |
| 5,351,075 A | 9/1994 | Herz et al. |
| 5,353,121 A | 10/1994 | Young et al. |
| 5,381,523 A | 1/1995 | Hayashi |
| 5,382,779 A | 1/1995 | Gupta |
| 5,410,344 A | 4/1995 | Graves et al. |
| 5,459,826 A | 10/1995 | Archibald |
| 5,483,278 A | 1/1996 | Strubbe et al. |
| 5,534,911 A | 7/1996 | Levitan |
| 5,535,320 A | 7/1996 | Gay et al. |
| 5,541,638 A | 7/1996 | Story |
| 5,541,738 A | 7/1996 | Mankovitz |
| 5,541,991 A | 7/1996 | Benson et al. |
| 5,546,193 A | 8/1996 | Hailey et al. |
| 5,548,708 A | 8/1996 | Sakashita et al. |
| 5,555,496 A | 9/1996 | Tackbary et al. |
| 5,559,549 A | 9/1996 | Hendricks et al. |
| 5,596,373 A | 1/1997 | White et al. |
| 5,600,364 A | 2/1997 | Hendricks et al. |
| 5,608,534 A | 3/1997 | Park et al. |
| 5,635,989 A | 6/1997 | Rothmuller |
| 5,647,181 A | 7/1997 | Hunts |
| 5,649,186 A | 7/1997 | Ferguson |
| 5,649,216 A | 7/1997 | Sieber |
| 5,657,414 A | 8/1997 | Lett et al. |
| 5,680,619 A | 10/1997 | Gudmundson et al. |
| 5,684,525 A | 11/1997 | Klosterman |
| 5,740,425 A | 4/1998 | Povilus |
| 5,748,257 A | 5/1998 | Kawabata et al. |
| 5,748,484 A | 5/1998 | Cannon et al. |
| 5,749,083 A | 5/1998 | Koda et al. |
| 5,761,372 A | 6/1998 | Yoshinobu et al. |
| 5,801,747 A | 9/1998 | Bedard |
| 5,822,014 A | 10/1998 | Steyer et al. |
| 5,822,123 A | 10/1998 | Davis et al. |
| 5,844,620 A | 12/1998 | Coleman et al. |
| 5,860,073 A | 1/1999 | Ferrel et al. |
| 5,861,906 A | 1/1999 | Dunn et al. |
| 5,870,718 A | 2/1999 | Spector |
| 5,873,073 A | 2/1999 | Bresnan et al. |
| 5,890,175 A | 3/1999 | Wong et al. |
| 5,907,704 A | 5/1999 | Gudmundson et al. |
| 5,926,825 A | 7/1999 | Shirakawa |
| 5,930,810 A | 7/1999 | Farros et al. |
| 5,933,811 A | 8/1999 | Angles et al. |
| 5,948,061 A | 9/1999 | Merriman et al. |
| 5,956,736 A | 9/1999 | Hanson et al. |
| 5,963,968 A | 10/1999 | Warmus et al. |
| 5,973,683 A | 10/1999 | Cragun et al. |
| 5,974,396 A | 10/1999 | Anderson et al. |
| 5,983,227 A | 11/1999 | Nazem et al. |
| 5,983,243 A | 11/1999 | Heiney et al. |
| 5,986,670 A | 11/1999 | Dries et al. |
| 5,987,454 A | 11/1999 | Hobbs |
| 5,999,912 A | 12/1999 | Wodarz et al. |
| 6,005,560 A | 12/1999 | Gill et al. |
| 6,005,597 A | 12/1999 | Barrett et al. |
| 6,009,410 A | 12/1999 | LeMole et al. |
| 6,026,417 A | 2/2000 | Ross et al. |
| 6,034,678 A | 3/2000 | Hoarty et al. |
| 6,035,584 A | 3/2000 | Barreto |
| 6,052,514 A | 4/2000 | Gill et al. |
| 6,064,967 A | 5/2000 | Speicher |
| 6,072,983 A | 6/2000 | Klosterman |
| 6,081,262 A | 6/2000 | Gill et al. |
| 6,085,485 A | 7/2000 | Murdock |
| 6,088,722 A | 7/2000 | Herz et al. |
| 6,094,186 A | 7/2000 | Kuroda et al. |
| 6,097,878 A | 8/2000 | Saib |
| 6,108,673 A | 8/2000 | Brandt et al. |
| 6,118,449 A | 9/2000 | Rosen et al. |
| 6,118,925 A | 9/2000 | Murata et al. |
| 6,119,101 A | 9/2000 | Peckover |
| 6,144,944 A | 11/2000 | Kurtzman, II et al. |
| 6,157,411 A | 12/2000 | Williams et al. |
| 6,167,382 A | 12/2000 | Sparks et al. |
| 6,182,050 B1 | 1/2001 | Ballard |
| 6,192,382 B1 | 2/2001 | Lafer et al. |
| 6,205,582 B1 | 3/2001 | Hoarty |
| 6,216,112 B1 | 4/2001 | Fuller et al. |
| 6,230,143 B1 | 5/2001 | Simons et al. |
| 6,243,375 B1 | 6/2001 | Speicher |
| 6,247,047 B1 | 6/2001 | Wolff |
| 6,253,238 B1 | 6/2001 | Lauder et al. |
| 6,271,860 B1 | 8/2001 | Gross |
| 6,286,005 B1 | 9/2001 | Cannon |
| 6,311,211 B1 | 10/2001 | Shaw et al. |
| 6,312,336 B1 | 11/2001 | Handelman et al. |
| 6,313,822 B1 | 11/2001 | McKay et al. |
| 6,317,883 B2 | 11/2001 | Marics |
| 6,334,109 B1 | 12/2001 | Kanevsky et al. |
| 6,356,903 B1 | 3/2002 | Baxter et al. |
| 6,385,592 B1 | 5/2002 | Angles et al. |
| 6,400,406 B1 | 6/2002 | Kim |
| 6,401,075 B1 | 6/2002 | Mason et al. |
| 6,405,371 B1 | 6/2002 | Oosterhout et al. |
| 6,415,316 B1 | 7/2002 | Van Der Meer |
| 6,425,128 B1 | 7/2002 | Krapf et al. |
| 6,438,752 B1 | 8/2002 | McClard |
| 6,446,045 B1 | 9/2002 | Stone et al. |
| 6,449,657 B2 | 9/2002 | Stanbach et al. |
| 6,462,754 B1 | 10/2002 | Chakraborty et al. |
| 6,463,585 B1 | 10/2002 | Hendricks et al. |
| 6,467,089 B1 | 10/2002 | Aust et al. |
| 6,473,794 B1 | 10/2002 | Guheen et al. |
| 6,477,705 B1 | 11/2002 | Yuen et al. |
| 6,484,148 B1 | 11/2002 | Boyd |
| 6,484,149 B1 | 11/2002 | Jammes et al. |
| 6,487,565 B1 * | 11/2002 | Schechter ............... G06T 15/00 345/418 |

(56) References Cited

U.S. PATENT DOCUMENTS

| | | |
|---|---|---|
| 6,493,688 B1 | 12/2002 | Das et al. |
| 6,496,857 B1 | 12/2002 | Dustin et al. |
| 6,513,035 B1 | 1/2003 | Tanaka et al. |
| 6,519,571 B1 | 2/2003 | Guheen et al. |
| 6,526,577 B1 | 2/2003 | Knudson et al. |
| 6,538,701 B1 | 3/2003 | Yuen |
| 6,553,178 B2 | 4/2003 | Abecassis |
| 6,567,854 B1 | 5/2003 | Olshansky et al. |
| 6,571,053 B1 | 5/2003 | Yasuzato |
| 6,587,835 B1 | 7/2003 | Treyz et al. |
| 6,589,292 B1 | 7/2003 | Langford-Wilson |
| 6,601,107 B1 | 7/2003 | Seibert |
| 6,604,088 B1 | 8/2003 | Landom et al. |
| 6,604,328 B1 | 8/2003 | Paddock |
| 6,611,348 B1 | 8/2003 | Chase et al. |
| 6,611,349 B1 | 8/2003 | Vogt et al. |
| 6,611,958 B1 | 8/2003 | Shintani et al. |
| 6,618,504 B1 | 9/2003 | Yoshino |
| 6,628,314 B1 | 9/2003 | Hoyle |
| 6,637,029 B1 | 10/2003 | Maissel et al. |
| 6,684,369 B1 | 1/2004 | Bernardo et al. |
| 6,691,093 B2 | 2/2004 | Shell |
| 6,701,060 B2 | 3/2004 | Yuen et al. |
| 6,704,931 B1 | 3/2004 | Schaffer et al. |
| 6,718,551 B1 | 4/2004 | Swix et al. |
| 6,728,966 B1 | 4/2004 | Arsenault et al. |
| 6,738,978 B1 | 5/2004 | Hendricks et al. |
| 6,748,397 B2 | 6/2004 | Choi |
| 6,763,334 B1 | 7/2004 | Matsumoto et al. |
| 6,795,972 B2 | 9/2004 | Rovira |
| 6,799,327 B1 | 9/2004 | Reynolds et al. |
| 6,801,917 B2 | 10/2004 | Gutta et al. |
| 6,810,526 B1 | 10/2004 | Menard et al. |
| 6,813,776 B2 | 11/2004 | Chernock et al. |
| 6,829,587 B2 | 12/2004 | Stone et al. |
| 6,829,780 B2 | 12/2004 | Kraft et al. |
| 6,847,969 B1 | 1/2005 | Mathai et al. |
| 6,851,090 B1 | 2/2005 | Gutta et al. |
| 6,889,385 B1 | 5/2005 | Rakib et al. |
| 6,918,132 B2 | 7/2005 | Gargi |
| 6,922,844 B1 | 7/2005 | Arsenault et al. |
| 6,954,728 B1 | 10/2005 | Kusumoto et al. |
| 6,958,759 B2 | 10/2005 | Safadi et al. |
| 6,973,665 B2 | 12/2005 | Dudkiewicz et al. |
| 6,983,478 B1 | 1/2006 | Grauch et al. |
| 7,010,497 B1 | 3/2006 | Nyhan et al. |
| 7,020,652 B2 | 3/2006 | Matz et al. |
| 7,047,309 B2 * | 5/2006 | Baumann et al. ............ 709/232 |
| 7,051,352 B1 | 5/2006 | Schaffer |
| 7,055,165 B2 | 5/2006 | Connelly |
| 7,069,228 B1 | 6/2006 | Rose et al. |
| 7,109,985 B2 | 9/2006 | Spencer et al. |
| 7,120,591 B1 | 10/2006 | Solomon et al. |
| 7,131,134 B2 | 10/2006 | Trovato et al. |
| 7,143,066 B2 | 11/2006 | Shear et al. |
| 7,143,160 B2 | 11/2006 | Tamaki |
| 7,146,626 B1 | 12/2006 | Arsenault et al. |
| 7,152,237 B2 | 12/2006 | Flickinger et al. |
| 7,159,175 B2 | 1/2007 | Ishii et al. |
| 7,165,041 B1 | 1/2007 | Guheen et al. |
| 7,171,677 B1 | 1/2007 | Ochiai |
| 7,181,445 B2 | 2/2007 | Bebo et al. |
| 7,188,355 B1 | 3/2007 | Prokopenko et al. |
| 7,188,356 B1 | 3/2007 | Miura et al. |
| 7,200,853 B2 | 4/2007 | Kawai |
| 7,213,027 B1 | 5/2007 | Kominek et al. |
| 7,231,607 B2 | 6/2007 | Neely |
| 7,239,779 B2 | 7/2007 | Little |
| 7,240,025 B2 | 7/2007 | Stone et al. |
| 7,249,059 B2 | 7/2007 | Dean et al. |
| 7,254,829 B1 | 8/2007 | Brown et al. |
| 7,263,270 B1 | 8/2007 | Lapstun et al. |
| 7,263,709 B1 | 8/2007 | Krapf |
| 7,266,733 B2 | 9/2007 | Bazinet et al. |
| 7,284,064 B1 | 10/2007 | Connelly |
| 7,292,723 B2 | 11/2007 | Tedesco et al. |
| 7,304,685 B2 | 12/2007 | Park et al. |
| 7,312,772 B2 | 12/2007 | Kim |
| 7,315,983 B2 | 1/2008 | Evans et al. |
| 7,319,976 B1 | 1/2008 | Peckover |
| 7,340,457 B1 | 3/2008 | Killian et al. |
| 7,343,157 B1 | 3/2008 | Mitchell |
| 7,343,354 B2 | 3/2008 | Hennessey |
| 7,398,541 B2 | 7/2008 | Bennington et al. |
| 7,421,467 B2 | 9/2008 | Kaneko et al. |
| 7,421,724 B2 | 9/2008 | Klosterman et al. |
| 7,428,555 B2 | 9/2008 | Yan |
| 7,434,160 B2 | 10/2008 | Peiro et al. |
| 7,440,674 B2 | 10/2008 | Plotnick et al. |
| 7,441,260 B1 | 10/2008 | Kurapati |
| 7,444,658 B1 | 10/2008 | Matz et al. |
| 7,464,344 B1 | 12/2008 | Carmichael et al. |
| 7,469,943 B2 | 12/2008 | Hiramoto |
| 7,480,701 B2 | 1/2009 | Smith et al. |
| 7,487,529 B1 | 2/2009 | Orlick |
| 7,493,641 B2 | 2/2009 | Klosterman et al. |
| 7,496,943 B1 | 2/2009 | Goldberg et al. |
| 7,499,628 B2 | 3/2009 | Yuen et al. |
| 7,500,202 B2 | 3/2009 | Gerba et al. |
| 7,503,058 B2 | 3/2009 | Van Horck |
| 7,508,942 B2 | 3/2009 | Candelore |
| 7,509,580 B2 | 3/2009 | Sezan et al. |
| 7,533,034 B2 | 5/2009 | Laurin et al. |
| 7,542,657 B2 | 6/2009 | Yuen et al. |
| 7,552,458 B1 | 6/2009 | Finseth et al. |
| 7,564,369 B1 | 7/2009 | Adams et al. |
| 7,631,329 B1 | 12/2009 | Yamada |
| 7,644,425 B2 | 1/2010 | Parker et al. |
| 7,653,603 B1 | 1/2010 | Holtkamp, Jr. et al. |
| 7,668,950 B2 | 2/2010 | Horowitz et al. |
| 7,685,019 B2 | 3/2010 | Collins |
| 7,698,719 B2 | 4/2010 | Evans et al. |
| 7,752,073 B2 | 7/2010 | Barry et al. |
| 7,757,252 B1 | 7/2010 | Agasse |
| 7,774,341 B2 | 8/2010 | Aravamudan et al. |
| 7,797,168 B2 | 9/2010 | Kusumoto et al. |
| 7,814,421 B2 | 10/2010 | Reynolds et al. |
| 7,827,062 B2 | 11/2010 | Merriman et al. |
| 7,840,437 B2 | 11/2010 | Lewis |
| 7,844,985 B2 | 11/2010 | Hendricks et al. |
| 7,853,969 B2 | 12/2010 | Smith et al. |
| 7,873,972 B2 | 1/2011 | Zaslavsky et al. |
| 7,890,490 B1 | 2/2011 | Bovenschulte et al. |
| 7,903,652 B2 * | 3/2011 | Huang ................ H04L 65/4076 370/390 |
| 7,904,814 B2 | 3/2011 | Errico et al. |
| 7,904,922 B1 | 3/2011 | Haberman et al. |
| 7,930,207 B2 | 4/2011 | Merriman et al. |
| 7,937,725 B1 | 5/2011 | Schaffer et al. |
| 7,970,648 B2 | 6/2011 | Gailey et al. |
| 7,992,068 B2 | 8/2011 | Chen et al. |
| 7,996,864 B2 | 8/2011 | Yuen et al. |
| 8,001,487 B2 | 8/2011 | Koppert |
| 8,032,414 B2 | 10/2011 | Payne et al. |
| 8,032,835 B1 | 10/2011 | Clevenger |
| 8,032,853 B2 | 10/2011 | Awashima |
| 8,056,099 B2 | 11/2011 | Shanks et al. |
| 8,091,031 B2 | 1/2012 | Evans |
| 8,341,550 B2 | 12/2012 | De Heer et al. |
| 8,359,616 B2 | 1/2013 | Rosenberg et al. |
| 8,745,647 B1 * | 6/2014 | Shin et al. ................... 725/9 |
| 9,003,447 B2 * | 4/2015 | Harboe ................ H04N 7/15 725/46 |
| 9,106,424 B2 * | 8/2015 | Shelansky ............ G06F 21/41 |
| 2001/0034654 A1 | 10/2001 | Vigil et al. |
| 2002/0010926 A1 | 1/2002 | Lee |
| 2002/0036654 A1 | 3/2002 | Evans et al. |
| 2002/0042921 A1 | 4/2002 | Ellis |
| 2002/0049975 A1 | 4/2002 | Thomas et al. |
| 2002/0059094 A1 | 5/2002 | Hosea et al. |
| 2002/0059621 A1 | 5/2002 | Thomas et al. |
| 2002/0067376 A1 | 6/2002 | Martin et al. |
| 2002/0087986 A1 | 7/2002 | Markel |
| 2002/0178446 A1 | 11/2002 | Sie et al. |

(56) References Cited

U.S. PATENT DOCUMENTS

| | | |
|---|---|---|
| 2002/0194591 A1 | 12/2002 | Gargi |
| 2003/0051238 A1 | 3/2003 | Barone |
| 2003/0084441 A1 | 5/2003 | Hunt |
| 2003/0084446 A1 | 5/2003 | Thurston et al. |
| 2003/0097657 A1 | 5/2003 | Zhou et al. |
| 2003/0103088 A1 | 6/2003 | Dresti et al. |
| 2003/0115597 A1 | 6/2003 | Yassin et al. |
| 2003/0131355 A1 | 7/2003 | Berenson et al. |
| 2003/0135464 A1 | 7/2003 | Mourad et al. |
| 2003/0145323 A1 | 7/2003 | Hendricks et al. |
| 2003/0171991 A1 | 9/2003 | Robbins |
| 2003/0204846 A1 | 10/2003 | Breen et al. |
| 2003/0204854 A1 | 10/2003 | Blackketter et al. |
| 2004/0039648 A1 | 2/2004 | Candelore et al. |
| 2004/0070593 A1 | 4/2004 | Neely et al. |
| 2004/0078809 A1 | 4/2004 | Drazin |
| 2004/0184548 A1 | 9/2004 | Kerbiriou et al. |
| 2004/0194128 A1 | 9/2004 | McIntyre et al. |
| 2004/0255336 A1 | 12/2004 | Logan et al. |
| 2004/0261112 A1 | 12/2004 | Hicks, III et al. |
| 2004/0268413 A1 | 12/2004 | Reid et al. |
| 2005/0010531 A1 | 1/2005 | Kushalnagar et al. |
| 2005/0018079 A1 | 1/2005 | Van Der Vleuten |
| 2005/0021761 A1 | 1/2005 | Thomas |
| 2005/0063677 A1 | 3/2005 | Kosako et al. |
| 2005/0155067 A1 | 7/2005 | McKenna, Jr. |
| 2005/0160468 A1 | 7/2005 | Rodriguez |
| 2005/0172314 A1 | 8/2005 | Krakora et al. |
| 2005/0203943 A1 | 9/2005 | Su et al. |
| 2006/0015911 A1 | 1/2006 | Dean |
| 2006/0039481 A1 | 2/2006 | Shen et al. |
| 2006/0059277 A1 | 3/2006 | Zito et al. |
| 2006/0085828 A1 | 4/2006 | Dureau et al. |
| 2006/0101338 A1 | 5/2006 | Kates |
| 2006/0125962 A1 | 6/2006 | Shelton et al. |
| 2006/0218583 A1 | 9/2006 | Vanparijs et al. |
| 2006/0230417 A1 | 10/2006 | Van Horck |
| 2006/0282852 A1 | 12/2006 | Purpura et al. |
| 2007/0011702 A1 | 1/2007 | Vaysman |
| 2007/0016925 A1 | 1/2007 | Vaysman et al. |
| 2007/0044127 A1 | 2/2007 | Vaysman et al. |
| 2007/0070218 A1 | 3/2007 | Meijer et al. |
| 2007/0113257 A1 | 5/2007 | Takemoto |
| 2007/0144090 A1 | 6/2007 | Nguyen |
| 2007/0157248 A1 | 7/2007 | Ellis |
| 2007/0174286 A1 | 7/2007 | Seitz et al. |
| 2007/0204302 A1 | 8/2007 | Calzone |
| 2007/0214470 A1 | 9/2007 | Glasgow et al. |
| 2007/0214478 A1 | 9/2007 | Feldstein et al. |
| 2007/0234388 A1 | 10/2007 | King |
| 2007/0250862 A1* | 10/2007 | Miyamaki ........ G08B 13/19671 725/46 |
| 2008/0002580 A1 | 1/2008 | Kawada et al. |
| 2008/0059312 A1 | 3/2008 | Gern et al. |
| 2008/0092182 A1 | 4/2008 | Conant |
| 2008/0154803 A1 | 6/2008 | Stein et al. |
| 2008/0183577 A1 | 7/2008 | Evans |
| 2008/0196071 A1 | 8/2008 | Manthoulis |
| 2008/0275786 A1 | 11/2008 | Gluck |
| 2008/0282290 A1 | 11/2008 | Malik et al. |
| 2009/0044227 A1* | 2/2009 | Nagatani et al. ................ 725/46 |
| 2009/0055268 A1 | 2/2009 | Knoller et al. |
| 2009/0158337 A1 | 6/2009 | Stiers et al. |
| 2009/0259957 A1 | 10/2009 | Slocum et al. |
| 2009/0287610 A1 | 11/2009 | Bradshaw et al. |
| 2010/0017820 A1 | 1/2010 | Thevathasan et al. |
| 2010/0153983 A1 | 6/2010 | Philmon et al. |
| 2010/0205562 A1 | 8/2010 | de Heer |
| 2010/0293566 A1* | 11/2010 | Valdez ........................... 725/14 |
| 2010/0324997 A1 | 12/2010 | Evans |
| 2011/0110515 A1 | 5/2011 | Tidwell et al. |
| 2011/0125586 A1 | 5/2011 | Evans |
| 2011/0125591 A1 | 5/2011 | Evans |
| 2011/0138327 A1 | 6/2011 | Scott et al. |
| 2011/0202960 A1 | 8/2011 | Vaysman |
| 2011/0209173 A1 | 8/2011 | Vaysman |
| 2011/0209179 A1 | 8/2011 | Vaysman et al. |
| 2011/0225612 A1 | 9/2011 | Vaysman |
| 2011/0265120 A1 | 10/2011 | Vaysman |
| 2011/0296467 A1 | 12/2011 | Vaysman |
| 2011/0307925 A1 | 12/2011 | Vaysman |
| 2011/0314501 A1 | 12/2011 | Vaysman |
| 2012/0011544 A1 | 1/2012 | Vaysman |
| 2012/0072952 A1 | 3/2012 | Vaysman |
| 2012/0254909 A1* | 10/2012 | Serdiuk .......................... 725/12 |
| 2012/0254910 A1 | 10/2012 | Donoghue et al. |
| 2013/0298149 A1* | 11/2013 | Tidwell et al. ................. 725/13 |

FOREIGN PATENT DOCUMENTS

| | | |
|---|---|---|
| EP | 1280343 | 1/2003 |
| EP | 1423794 | 6/2004 |
| EP | 0965192 | 2/2007 |
| FR | 2836321 | 8/2003 |
| GB | 2375674 | 11/2002 |
| JP | 2001-527320 A | 12/2001 |
| JP | 2003-179901 A | 6/2003 |
| WO | WO 98/08176 | 2/1998 |
| WO | WO 99/17258 | 4/1999 |
| WO | WO0237840 | 5/2002 |
| WO | WO0245304 | 6/2002 |
| WO | WO02102079 | 12/2002 |
| WO | WO03054678 | 7/2003 |
| WO | WO2005107245 | 11/2005 |
| WO | WO2006018825 | 2/2006 |
| WO | WO2006055243 | 5/2006 |
| WO | 2009/033187 A1 | 3/2009 |

OTHER PUBLICATIONS

U.S. Appl. No. 13/479,608, Zaslavsky.
U.S. Appl. No. 13/482,127, Zaslavsky.
U.S. Appl. No. 13/487,528, Zaslavsky.
U.S. Appl. No. 13/490,338, Zaslavsky.
PCT Search Report for PCT/US2012/39683, dated Aug. 10, 2012.
PCT Search Report for PCT/US2012/38328, dated Aug. 9, 2012.
PCT Search Report for PCT/US2012/39280, dated Aug. 13, 2012.
"Using SI Tables to Create Electronic Program Guide," Hewlett Packard.
PCT Patentability Report for PCT/US2006/003420, dated Apr. 3, 2008.
PCT Search Report for PCT/US2006/003420, dated Apr. 3, 2008.
PCT Patentability Report for PCT/US12/40683, dated Aug. 9, 2012.
PCT Patentability Report for PCT/US12/41154, dated Aug. 14, 2013.
PCT Search and Patentability Report for PCT/US2012/032323, dated Jun. 19, 2012.
PCT Search and Patentability Report for PCT/US2014/057375, dated Dec. 24, 2014.
EP Search Report for PCT/US2012040683, dated Aug. 27, 2014.
PCT Search Report for PCT/US2013/053894, dated Feb. 10, 2015.
Kisel A et al: "Utilizing a Personalization-Enabled Access Node in Support of Converged Cross-Domain Scoring and Advertising",Bell Labs Technical Journal, Wiley, CA, US, vol. 15, No. 1, Jun. 1, 2010,pp. 77-93, XP001553593, ISSN: 1089-7089, DOI: 10.1002/BLTJ.20425.
Japanese Office Action, JP Patent Application No. 2014-511533, Apr. 28, 2016, 15 pages.
European Office Action, EP Patent Application No. 12 785 937.9, May 2, 2016, 9 pages.
Japanese Office Action, JP Patent Application No. 2014-511533, Apr. 28, 2016, 13 pages (English translation provided).

* cited by examiner

SYSTEM AND METHOD FOR SCALABLE, HIGH ACCURACY, SENSOR AND ID BASED AUDIENCE MEASUREMENT SYSTEM BASED ON DISTRIBUTED COMPUTING ARCHITECTURE

REFERENCE TO RELATED APPLICATIONS

This application claims priority to U.S. provisional Application Ser. No. 61/486,974, filed May 17, 2011, entitled "System and Method for High Accuracy Measurement of Ad Consumption and Viewers' Emotional and Cognitive Response," U.S. provisional Application Ser. No. 61/490,677, filed May 27, 2011, entitled "Method and Apparatus for Mapping Available Data Generating Resources Against Data Collection Requests in an Audience Measurement System." U.S. provisional Application Ser. No. 61/491,494, filed May 31, 2011, entitled "Dynamic Panel Creation for Highly Scalable Audience Measurement Systems," and U.S. provisional Application Ser. No. 61/492,429, filed Jun. 2, 2011, entitled "System and Method for Increasing the Effectiveness of TV/Video Ads," which are all hereby specifically and entirely incorporated by reference.

BACKGROUND

1. Field of the Invention

The invention is directed to television advertisements. Specifically, the invention is directed to monitoring the effectiveness of television advertisements.

2. Background of the Invention

Existing television (TV) advertisement (ad or commercial) injection and delivery systems and Audience Measurement Systems (AMS) have evolved as an amalgamation of multi-vendor, multi-protocol hardware and software components. These components were not built to work well together. The components communicate with each other over "integration points" without necessarily relaying all the data needed by the AMS. As such, the components do not take into consideration advertisers' demands to receive accurate, reliable, and timely ad viewership reporting data.

In existing TV systems, ads, including audio and/or video and/or interactive enhancements (for example Enhanced TV Binary Interchange Format (EBIF) applications), are injected at several points. Ads can be injected by, for example the national broadcasters (i.e. NBC or ABC), the programming networks (e.g. ESPN), the local programming network affiliates, the cable operators (or equivalent) with centralized ad injection at the head-end, the cable operators with targeted ads with distributed injection over switched digital video infrastructure, cable operators with targeted ads stored in Digital Video Recorders (DVRs) and injected into live or recorded streams, Video on Demand (VOD) operators, or Internet video streaming operators.

To generate accurate ad viewership information for all ad types, a client device based AMS system, which logs events on a client device, has to rely on the accuracy of information it receives from all ad injection points for all ad types. Existing AMS systems perform well when (and only when) program guide scheduling data, broadcast advertisement scheduling data, client device logged event data, and other relevant pieces of information are accurate and completely in synchronization.

However, in real life, there are many exceptions (e.g. sporting events running overtime or breaking news) which cause changes to any one of the abovementioned schedules. Such changes are not propagated through the system in real-time. This shortcoming prevents the AMS from receiving accurate and synchronized information from all relevant sources on time, precluding the AMS from generating accurate ad viewership reports. Furthermore, traditional AMS do not provide information on which ads were actually displayed on the display device (e.g. TV) or if a viewer has actually viewed the ad. Finally, traditional AMS cannot measure actual viewer reaction to ads if the ads have no calls to action (e.g. click to buy, call to buy, click to get coupon, or click to get more information).

For example U.S. Pat. No. 6,983,478 to Grauch et al. discloses a typical, existing AMS. Grauch discloses a system that tracks a viewer's clickstream (i.e. the button presses on the user's remote control) data and attempts to match it with guide scheduling data records and advertisement scheduling data records. Such systems generate a large amount of data that must be sifted through to determine viewership. Furthermore, the data is often inaccurate due to unreported scheduling changes (e.g. a sporting event runs over or a breaking news event occurs), misread or unread clicks (e.g. if a button is pressed but the TV does not receive the command or if a button is pressed but the AMS does not register the pressed button), or other unforeseen events.

In a system similar to the AMS system disclosed by Grauch, will generate, transport, and store billions of records per day. The records will have to be analyzed and compiled into reports which takes enormous amounts of computing power. As such, existing systems relay on small sample sizes (panels) which are setup and updated over very long periods of time (e.g. months or years). Such infrequent updates and small sample sizes (usually in the thousands of viewers) preclude typical AMS from accurately measuring viewership of many types (movies, shows, advertisement spots, infomercials) and units (specific titles) of content. Moreover, for the content that typical AMS do measure, there is a high margin of error.

SUMMARY OF THE INVENTION

The present invention overcomes the problems and disadvantages associated with current strategies and designs and provides new tools and methods of monitoring and enhancing ad viewership.

One embodiment of the invention is directed to a dynamic television audience measurement system (AMS). The system comprises a central level AMS sub-system, a local node level AMS sub-system in communication with the central level AMS sub-system, a plurality of client device level AMS sub-systems in communication with the local node level AMS sub-system, and a plurality of display devices, wherein each display device is monitored by a client level AMS sub-system. The central level AMS sub-system receives panel definitions from panel requestors, transmits the panel definitions to the local node level AMS sub-system, and receives a merged viewership report from the local node level AMS sub-system. The local node level AMS sub-system receives panel definitions from the central level AMS sub-system, transmits the panel definitions to the plurality of client level AMS sub-systems, receives viewership reports from each client level AMS sub-systems, merges the viewership reports into the merged viewership report, and transmits the merged viewership report to the central level AMS sub-system. Each of the plurality of client level AMS sub-systems receives panel definitions from the local node level AMS sub-system, compiles the viewership report based on viewer's actions, and transmits the viewership report to the local node level AMS sub-system.

In the preferred embodiment, the central level AMS sub-system is maintained by a broadcaster, pay TV service operator, broadband TV service operator, or advertisement agency. Preferably, the local node level AMS sub-system is maintained by a cable company, a satellite TV company, a broadband TV company, or an internet service provider. Each client level AMS sub-system is preferably stored on a set top box, a TV, a computer, a tablet, a smartphone, or a streaming media device.

The panel definitions preferably comprise criteria to be monitored by each client level AMS sub-system. Preferably, the criteria to be monitored are chosen from the group comprising target audience, media content, data to be collected, schedule for data collection, and rate of data collection. In the preferred embodiment, the target audience comprises at least one of viewer location, viewer demographic characteristics, viewer social characteristics, viewer socioeconomic characteristics, viewer housing characteristics, and viewer purchasing profile characteristics.

Preferably, the media content comprises at least one of the source of the content, the advertisements displayed, the programs displayed, the channels, and the media packages purchased. Preferably, the data to be collected is chosen from at least one of remote control button presses, messages and events received from client device, and messages and events received from rendering device. Preferably, the schedule for data collection comprises at least one of start date and time, end date and time, and recurrence of data collection. Preferably, the rate of data collection comprises at least one of reporting frequency, reporting granularity, and format of the reporting data. In a preferred embodiment, the central level AMS sub-system obtains and stores at least one of subscriber information, demographic information, socioeconomic data, national programming schedules, and national advertising data.

Preferably, the system further comprises multiple a local node level AMS sub-systems, wherein the central level AMS sub-system determines which local node level AMS sub-systems to transmit the panel definitions to based on the criteria to be monitored and the data stored at the central level AMS sub-system. Preferably the central level AMS sub-system compiles the merged viewership reports from each local node level AMS sub-system. The local node level AMS sub-system preferably determines which of the plurality of plurality of client level AMS sub-systems to transmit the panel definitions to based on the criteria to be monitored and the data stored at the central level AMS sub-system.

Preferably, at least one of a broadcaster subsystem and a service provider subsystem couples an identifier (ID) to at least one of a program or an advertisement. Preferably, the ID is at least one of ISCI, Ad-ID, UMID, ISAN, V-ISAN, ADI, or TID. At least one of the broadcaster subsystem and the service provider sub-system preferably couples metadata to at least one of a program or an advertisement. In the preferred embodiment, the metadata comprises at least one of a start flag or an end flag.

Preferably, each client level AMS sub-system monitors and records events based on the panel definitions. The monitored events are preferably at least one of channel watched, program watched, advertisement watched, remote control button pressed, viewer's brainwaves, viewer's body movements, viewer's speech, and changes in viewer's pupil size, temperature, pulse rate, perspiration, breathing, or blood pressure. Preferably, the events are recorded with the ID of the program or advertisement that is being viewed at the time of the event.

The client level AMS sub-system preferably adjusts the playback of the content based on the monitored events. Preferably, the adjustments to the playback of the content are chosen from changing the volume and turning off the display device.

Another embodiment of the invention is directed to a method of dynamically measuring a television audience with an audience measurement system (AMS). The method comprises the steps of receiving panel definitions from panel requestors at a central level AMS sub-system, transmitting the panel definitions from the central level AMS sub-system to a local node level AMS sub-system, receiving the panel definitions at the local node level AMS sub-system, transmitting the panel definitions from the local node level AMS sub-system to a plurality of client level AMS sub-systems, receiving the panel definitions at each of the client level AMS sub-systems, compiling a viewership report based on a viewer's actions at each of the client level AMS sub-systems, transmitting each viewership report from the client level AMS sub-systems to the local node level AMS sub-system, receiving the viewership reports at the local node level AMS sub-system, merging the viewership reports into a merged viewership report at the local node level AMS sub-system, transmitting the merged viewership report from the local node level AMS sub-system to the central level AMS sub-system, and receiving a merged viewership report at the central level AMS sub-system.

In the preferred embodiment, the central level AMS sub-system is maintained by a broadcaster, pay TV service operator, broadband TV service operator, or advertisement agency. The local node level AMS sub-system is preferably maintained by a cable company, a satellite TV company, a broadband TV company, or an internet service provider. Each client level AMS sub-system is preferably stored on a set top box, a TV, a computer, a tablet, a smartphone, or a streaming media device.

The panel definitions preferably comprise criteria to be monitored by each client level AMS sub-system. In the preferred embodiment, the criteria to be monitored are chosen from the group comprising target audience, media content, data to be collected, schedule for data collection, and rate of data collection. Preferably, the target audience comprises at least one of viewer location, viewer demographic characteristics, viewer social characteristics, viewer socioeconomic characteristics, viewer housing characteristics, and viewer purchasing profile characteristics.

The media content preferably comprises at least one of the source of the content, the advertisements displayed, the programs displayed, the channels, and the media packages purchased. Preferably, the data to be collected is chosen from at least one of rate of data collection, remote control button presses, messages and events received from client device, and messages and events received from rendering device.

The schedule for data collection preferably comprises at least one of start date and time, end date and time, and recurrence of data collection. The rate of data collection preferably comprises at least one of reporting frequency, reporting granularity, and format of the reporting data. The central level AMS sub-system preferably obtains and stores at least one of subscriber information, demographic information, socioeconomic data, national programming schedules, and national advertising data.

In the preferred embodiment, there are multiple local node level AMS sub-systems, further comprising the central level AMS sub-system determining which local node level AMS sub-systems to transmit the panel definitions to based on the criteria to be monitored and the data stored at the central level AMS sub-system. The method preferably further comprises the step of the central level AMS sub-system compiling the merged viewership reports from each local node level AMS sub-system. The method preferably further comprises the step of the local node level AMS sub-system determining which of the plurality of plurality of client level AMS sub-systems to transmit the panel definitions to based on the criteria to be monitored and the data stored at the central level AMS sub-system.

The method preferably further comprises the step of at least one of a broadcaster subsystem and a service provider subsystem coupling an identifier (ID) to at least one of a program or an advertisement. Preferably, the ID is at least one of ISCI, Ad-ID, UMID, ISAN, V-ISAN, ADI, or TID. The method preferably further comprises the step of at least one of the broadcaster subsystem and the service provider subsystem coupling metadata to at least one of a program or an advertisement. The metadata preferably comprises at least one of a start flag or an end flag.

Each client level AMS sub-system preferably monitors and records events based on the panel definitions. Preferably, the monitored events are at least one of channel watched, program watched, advertisement watched, remote control button pressed, viewer's brainwaves, viewer's body movements, viewer's speech, and changes in viewer's pupil size, temperature, pulse rate, perspiration, breathing, or blood pressure.

In the preferred embodiment, the events are recorded with the ID of the program or advertisement that is being viewed at the time of the event. The method preferably further comprises the step of the client level AMS sub-system adjusting the playback of the content based on the monitored events. The adjustments to the playback of the content are preferably chosen from changing the volume and turning off the display device.

Another embodiment of the invention is directed to a central level dynamic television audience measurement system (AMS) sub-system. The sub-system comprises a processor, at least one database in communication with the processor, an input output device in communication with the processor, and software executing on the processor. The software causes the central level AMS sub-system to receive panel definitions from panel requestors, transmit the panel definitions to a local node level AMS sub-system, and receive viewership reports from the local node level AMS sub-system.

In the preferred embodiment, the central level AMS sub-system is maintained by a broadcaster, pay TV service operator, broadband TV service operator, advertisement agency. Preferably, the panel definitions comprise criteria to be monitored by client level AMS sub-systems. Preferably, the criteria to be monitored are chosen from the group comprising target audience, media content, data to be collected, schedule for data collection, and rate of data collection.

The target audience preferably comprises at least one of viewer location, viewer demographic characteristics, viewer social characteristics, viewer socioeconomic characteristics, viewer housing characteristics, and viewer purchasing profile characteristics. The media content preferably comprises at least one of the source of the content, the advertisements displayed, the programs displayed, the channels, and the media packages purchased. The data to be collected is preferably chosen from at least one of rate of data collection, remote control button presses, messages and events received from client device, and messages and events received from rendering device.

Preferably, the schedule for data collection comprises at least one of start date and time, end date and time, and recurrence of data collection. Preferably, the rate of data collection comprises at least one of reporting frequency, reporting granularity, and format of the reporting data. Preferably, the at least one database stores at least one of subscriber information, demographic information, socioeconomic data, national programming schedules, and national advertising data. The software preferably determines which local node level AMS sub-systems to transmit the panel definitions to based on the criteria to be monitored and the data stored in the at least one database.

The software preferably compiles the merged viewership reports from each local node level AMS sub-system. Preferably, at least one of a broadcaster subsystem and a service provider subsystem couples an identifier (ID) to at least one of a program or an advertisement. The ID is preferably, at least one of ISCI, Ad-ID, UMID, ISAN, V-ISAN, ADI, or TID. Preferably, at least one of the broadcaster subsystem and the service provider subsystem couples metadata to at least one of a program or an advertisement. The metadata preferably comprises at least one of a start flag or an end flag.

Another embodiment of the invention is directed to a local node level dynamic television audience measurement system (AMS) sub-system. The Sub-system comprises a processor, at least one database in communication with the processor, an input/output device in communication with the processor, and software executing on the processor. The software causes the local node level AMS sub-system to receive panel definitions from a central level AMS sub-system, transmit the panel definitions to a plurality of client level AMS sub-systems, receive viewership reports from each client level AMS sub-systems, merge the viewership reports into a merged viewership report, and transmit the merged viewership report to the central level AMS sub-system.

Preferably, the local node level AMS sub-system is maintained by a cable company, a satellite TV company, a streaming media company, or an internet service provider. In the preferred embodiment, the panel definitions comprise criteria to be monitored by each client level AMS sub-system. The criteria to be monitored are preferably chosen from the group comprising target audience, media content, data to be collected, schedule for data collection, and rate of data collection.

Preferably, the target audience comprises at least one of viewer location, viewer demographic characteristics, viewer social characteristics, viewer socioeconomic characteristics, viewer housing characteristics, and viewer purchasing profile characteristics. Preferably, the media content comprises at least one of the source of the content, the advertisements displayed, the programs displayed, the channels, and the media packages purchased. Preferably, the data to be collected is chosen from at least one of rate of data collection, remote control button presses, messages and events received from client device, and messages and events received from rendering device.

In the preferred embodiment, the schedule for data collection comprises at least one of start date and time, end date and time, and recurrence of data collection. The rate of data collection preferably comprises at least one of reporting frequency, reporting granularity, and format of the reporting data. The software preferably determines which of the plurality of plurality of client level AMS sub-systems to transmit the panel definitions to based on at least the criteria to be monitored.

At least one of a broadcaster subsystem and a service provider subsystem preferably couples an identifier (ID) to at least one of a program or an advertisement. The ID is preferably at least one of ISCI, Ad-ID, UMID, ISAN, V-ISAN, ADI, or TID. Preferably, at least one of the broadcaster subsystem and the service provider subsystem couples metadata to at least one of a program or an advertisement. The metadata preferably comprises at least one of a start flag or an end flag.

Another embodiment of the invention is directed to a client level dynamic television audience measurement system (AMS) sub-system. The sub-system comprises a processor, at least one database in communication with the processor, an input/output device in communication with the processor, and software executing on the processor. The software causes the client level AMS sub-systems to receive panel definitions from a local node level AMS sub-system, compile a viewership report based on viewer's actions, and transmit the viewership report to the local node level AMS sub-system.

The client level AMS sub-system is preferably stored on a set top box, a TV, a computer, a tablet, a smartphone, or a streaming media device. The panel definitions preferably comprise criteria to be monitored by each client level AMS sub-system.

Preferably, the criteria to be monitored are chosen from the group comprising target audience, media content, data to be collected, schedule for data collection, and rate of data collection. Preferably, the target audience comprises at least one of viewer location, viewer demographic characteristics, viewer social characteristics, viewer socioeconomic characteristics, viewer housing characteristics, and viewer purchasing profile characteristics. Preferably, the media content comprises at least one of the source of the content, the advertisements displayed, the programs displayed, the channels, and the media packages purchased.

The data to be collected is preferably chosen from at least one of rate of data collection, remote control button presses, messages and events received from client device, and messages and events received from rendering device. The schedule for data collection preferably comprises at least one of start date and time, end date and time, and recurrence of data collection. Preferably, the rate of data collection comprises at least one of reporting frequency, reporting granularity, and format of the reporting data.

The sub-system preferably comprises at least one sensor. The at least one sensor is preferably chosen from the group comprising a camera, a moisture sensor, a microphone, a heart rate monitor, and a brainwave monitor. The software preferably monitors and records events based on the panel definitions. Preferably, the monitored events are at least one of channel watched, program watched, advertisement watched, remote control button pressed, viewer's brainwaves, viewer's body movements, viewer's speech, and changes in viewer's pupil size, temperature, pulse rate, perspiration, breathing, or blood pressure. In the preferred embodiment, the events are recorded with an ID for the program or advertisement that is being viewed at the time of the event. The software preferably adjusts the playback of the content based on the monitored events. Preferably, the adjustments to the playback of the content are chosen from changing the volume and turning off a display device.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which.

DESCRIPTION OF THE INVENTION

Figure 1:
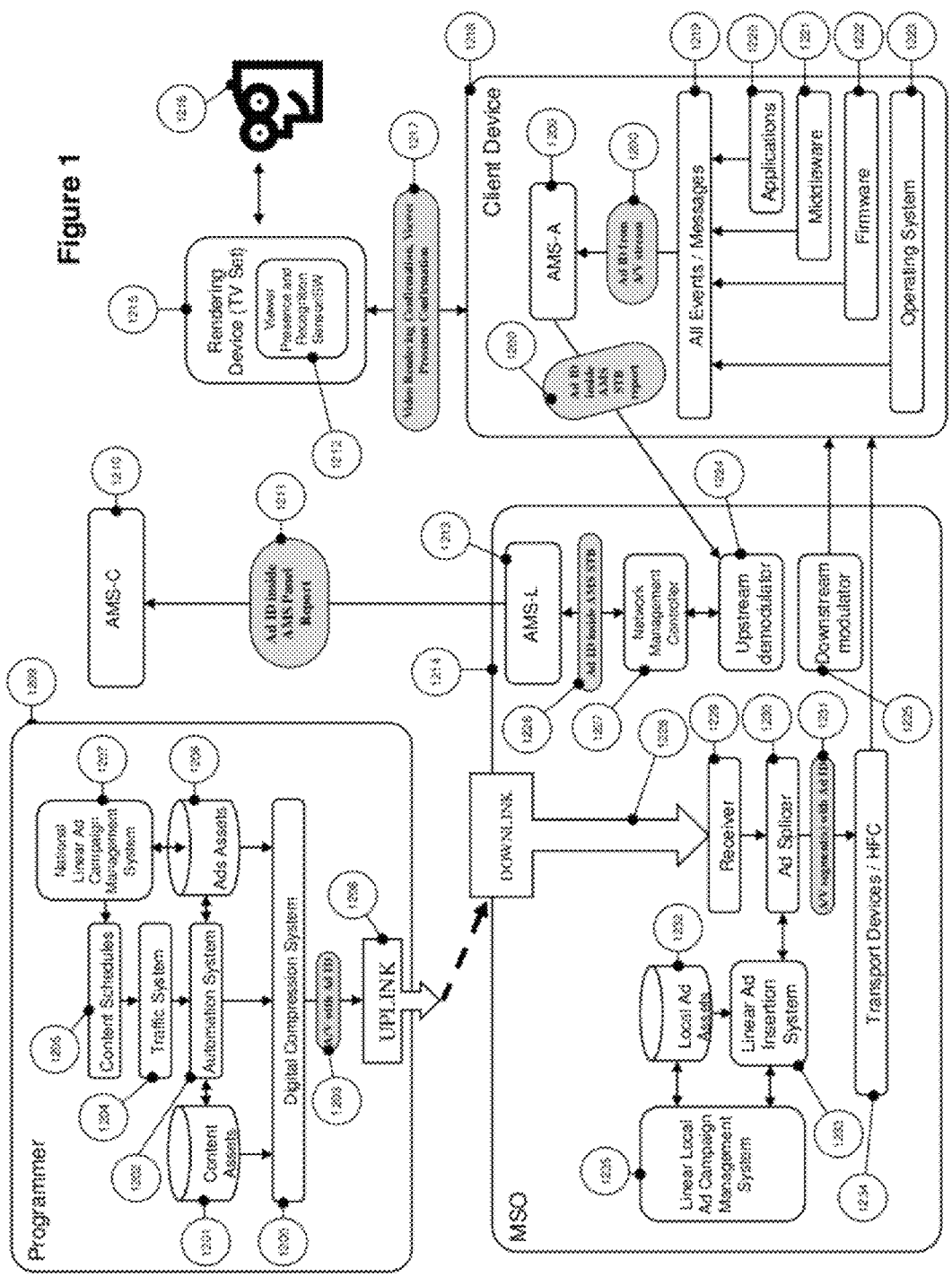
FIG. 1 depicts an embodiment of a TV ad injection architecture of the invention.

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention A problem in the art capable of being solved by the embodiments of the present invention is measuring TV viewership. It has been surprisingly discovered that by redesigning the TV ad injection and AMS components of a broadcast system and measuring viewers' responses to advertisements precise viewership reporting can be achieved.

The AMS collects data and creates cost-effective, census level accuracy reports. In the preferred embodiment the AMS is comprised of several tiers of distributed computing components residing at different typological network points within the content distribution system to enable cost-effective processing of large amount of collected data. Tier 1 is comprised of AMS-A, Tier 2 of AMS-L, Tier 3 AMS-C. AMS-A is an AMS client application which resides in video playback device, e.g TV set, set top box, video streaming adapter. AMS-L is a backend server based sub-system which acts as a first collecting and pre-processing point for the data generated by AMS-A components. After data pre-processing is completed, AMS-L sends data to AMS-C. AMS-C is a backend server based sub-system which acts as a last data processing prior to data being archived and exported to ad agencies. Depending on content distribution network topology and scale, locations and total number of AMS-L components would vary. For example, small content distribution system would only have AMS-A and AMS-L components and utilize AMS-C component located outside of that particular content distribution network.

Each AMS-A (client device level) is preferably responsible for receiving configuration messages from the AMS-L and executing the logging, processing, and report of events in accordance with the received configuration messages. Each AMS-A is preferably a client's set top box, TV, computer, tablet, smartphone, streaming media device, or other media playing device.

Each AMS-L (local node level) is preferably responsible for receiving panel definitions, subscriber profile information, and program and ad schedules from the AMS-C, a TV Traffic System, an Electronic Program Guide Server, and/or a Video-on-Demand server. The AMS-L is also preferably responsible for sending configuration messages to each AMS-A and performing upstream bandwidth optimization. The AMS-L is also preferably responsible for receiving reports from each AMS-A, merging panel reports, and sending requested reports to the AMS-C for further merging. Each AMS-L is preferably maintained by a media service provider such as a cable company, a satellite TV company, a streaming media company, or an internet service provider.

The AMS-C (central level) is preferably responsible for receiving panel definitions from ad agencies, subscriber demographics and socioeconomic metadata from source agencies, programming metadata from national broadcasters, and ad schedules from ad agencies or broadcasters. The AMC-C is preferably responsible for merging requested information and mapping the information into available AMS-L subscriber bases. The AMS-C can receive and merge reports from multiple AMS-Ls. An AMS-C is preferably maintained by a media company such as a broadcaster, a cable TV channel, or an internet web-page.

In a preferred embodiment, the system of the invention injects ad identifiers into the audio/video transport stream. An ad identifier can be a proprietary or standardized content identifier, for example ISCI, Ad-ID, UMID, ISAN, V-ISAN, ADI, or TID. Furthermore, the system can inject ad metadata information into the ad. Such information may include an ad start flag and an ad end flag. Preferably, the identifiers and metadata will be coupled to the ad in such a way as to preclude integration points from removing the identifiers and metadata to ensure that the identifiers and metadata propagate with the commercial to the client device.

Preferably, the system will be able to monitor the transport streams on a client device for the identifiers and metadata. The client device will preferably generate and store ad events, including but not limited to ad identifiers, start times, and end times when they are detected. Furthermore, the system can record viewer reactions during and after ad playback by measuring one or more physical characteristics of a viewer. For example the system can measure brainwaves, pupil size and change, temperature, pulse rate and change, perspiration, breathing, blood pressure, body movements, and speech characteristics (e.g. tone and volume). Additionally, the system will generate and transmit AMS-A reports that include the stored ad events.

Preferably, the AMS-A architecture will allow for fewer backend components than traditional AMS and provide substantially error free reporting capability. The system will report which ads were actually decoded by a client device (e.g. set top box, streaming media player, gaming device, or smart TV) and sent out to a display device (e.g. TV).

FIG. 1 depicts an embodiment of a TV ad injection architecture of the invention. Generally, TV content, including some commercials, is generated by programming network 1209. The content can include, for example, TV shows, movies, news broadcast, and sporting events. The content is delivered to a plurality of Multi-System Operators (MSOs) 1214, for example cable, satellite, or broadband video service companies. The MSOs in turn, transmit the content to subscriber's client devices 1218. The client devices can be, for example, set-top boxes, TVs, or internet capable devices. Each client device includes a central processing unit, memory, and software stack comprised of operating system 1223, firmware 1222, middleware 1221, and applications 1220. Components of a software stack generate messages 1219 that are collected and processed by AMS-A module 1200. The content is rendered by the client device for display on a TV 1215 or other display device for viewing by the viewer 1216.

Programming network 1209 preferably has a selection of content assets 1201 for broadcasting and a selection of commercials 1208 for insertion into the content at the appropriate locations (i.e. during commercial breaks in the content). The programming network preferably has an automation system 1202 that schedules content 1205, including deciding which advertising assets 1208 to pair with which content assets 1201. The programming network system 1202 may choose which advertising assets to display based on a national linear ad campaign management system 1207. The chosen content and associated ads are prepared for transmission to the MSOs in a digital compression system 1200. The programming network 1209 injects a national video ad with Ad ID information 1203 into an encoded video stream for delivery via uplink module 1206 to MSO 1214.

Downlink module 1228 of MSO 1214 receives the encoded video stream at receiver 1229. MSO 1214 has a linear ad insertion system 1233 that identifies available ad spots for local ad insertion. Based on a linear local ad campaign management system 1235 and a selection on available local ad assets 1232, the MSO 1214 splices local ads 1230 into the video stream at appropriate time slots and attaches an Ad ID for the local ads 1231. The video stream with both national and local ads, both having Ad IDs, is sent to Transport Devices/Hybrid fiber-coaxial (HFC) module 1234 for broadcast to client devices 1218.

Client device 1218 receives the encoded video stream 1239 with the national and local ads, including the ad IDs and any additional metadata imbedded in the video stream. Preferably, the client device 1218 has an AMS application (AMS-A) 1200. The AMS-A 1200 receives and decodes ad event information, which can contain the ad identifier and other control information (e.g. ad start flag and ad end flag). The client device 1218 renders the content on display 1215 and the AMS-A 1200 records the event information including what was watched and when it was watched.

Returning to FIG. 1, in a preferred embodiment, the AMS-A 1200 will collect events and messages about content decoded by the client device. In addition, AMS-A will receive video rendering confirmation events and viewer present confirmation events from rendering device 1215. Collected information include who watched the show and what their reactions were to the show and the commercials. Preferably, the display device and/or client device has an array of sensors 1212 to collect biometrical information of the viewers. For example, the sensors may include, but are not limited to: cameras to determine the number of people in the room, the ages of the people in the room, the genders of the people in the room, movements of people in the room, or to monitor changes in pupil sizes; infrared cameras to monitor the temperature of the people in the room; moisture sensors to monitor changes in perspiration of people in the room; microphones to monitor speech or breathing rates; and other sensors to monitor brainwaves, changes in pulse rate, and changes in blood pressure. Additionally, the system may record button presses on the remote control (e.g. if a viewer changed the channel, changed the volume, or fast forwarded through a portion of the content).

With the display device 1215 connected via a unidirectional link with client device 1218, the AMS-A 1200 can collect ad event information and report back during upstream communication sessions. With the display device 1215 connected via a bi-directional link with client device 1218, the AMS-A 1200 can collect ad event information from both the client device 1218 and the display device 1215. Using information from both the client device 1218 and the display device 1215, the AMS-A 1200 may log error free information about ad viewership statistics which can then be passed to the AMS-L 1213 during an upstream communication session.

AMS-L 1213 may be able to pair the records received from client device 1218 with demographic information about the users of client device 1218. Since each client device 1218 has a unique identifier, AMS-L 1213 can obtain information, for example, from the user's billing statements to compile a database of demographic information about the users. Such information may include, but is not limited to, age, location, income, race, religion, gender, family makeup, cable packages purchased, and VOD usage. Preferably, the demographic information as well as any information recorded by the AMS is kept anonymous and not linked to a user's name or address. Based on the demographic information, the system can define panels of viewers 1211 and only record information from certain users within those panels. Client device 1218 sends reports to upstream demodulator 1224 which in turn sends the data to AMS-L 1213 via network management controller 1227. The data includes records which can be identified by set top box ID and Ad ID 1226. AMS-L 1213 sends report data, which includes Ad IDs inside AMS panel reports, to AMS-C 1210. Once the data from each client device are received, the AMS-C 1210 can apply analytic criteria to the results to generate viewership reports for export to advertisers. Additionally, the system can use panels to tell the client devices what information to collect.

Figure 2:
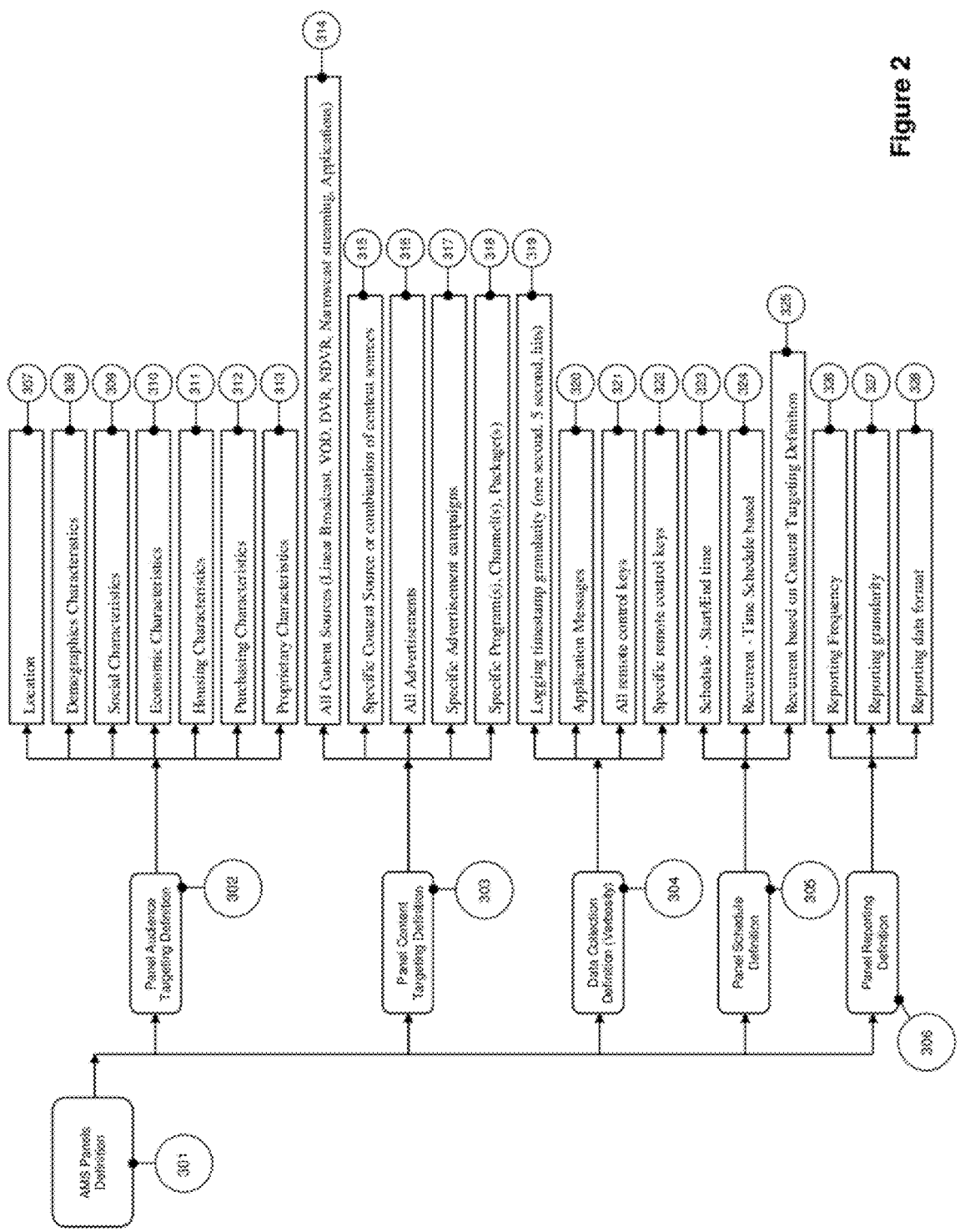
FIG. 2 depicts an embodiment of an AMS Panel Definition architecture and criteria.

FIG. 2 depicts an embodiment of an AMS Panel Definition architecture and criteria. The AMS panels definition 301 are determined by a party that requests a report from the AMS. The AMS may allow a part to specify a number of criteria for the report requested. For example, the requester may want to define a target audience 302. The target audience to be monitored may be based on audience location 307 (e.g. zip code, city, region, province, or DMA), audience demographics characteristics 308 (e.g. gender, age, or race), audience social characteristics 309 (e.g. education or marital status), audience economic characteristics 310 (e.g. employment status, occupation, or income), audience housing characteristics 311 (e.g. number of rooms, value, or mortgage status), audience purchasing characteristics 312 (e.g. purchasing volume, frequency or transaction size), audience proprietary characteristics 313 (i.e. parameters not included in the above listed categories).

The requester may also want to define panel content targeting 303, which specifies which types of content will be monitored by the AMS. For example the requester may define the panel to include all non-advertisement content from all sources 314 (e.g. all linear broadcasted channels, all video-on-demand, all digital video recorder content, all network digital video recorder content, and/or all narrowcast streaming (i.e. internet video)), a specific content source or a combination of content sources 315, all advertisements 316, specific advertisement campaigns 317, and/or specific programs, channels, or content packages 318.

The requester may also want to define the data to be collected 304 (e.g. what messages and level of detail will be monitored and logged by the AMS). For example, the requester can define how often to log events 319 (e.g. every second, every N seconds, or every hit), which messages to log 320 (e.g. advanced advertisement application messages), what remote control key presses to record 321, and/or if specific remote control keys are pressed 322. The requester may define the schedule of the panel 305, including but not limited to start and end times 323, and/or how often to repeat the panel based on time schedules 324 and/or based on the content target definition. Furthermore, the requester may define the reporting characteristics 306, including but not limited to reporting frequency 326, reporting granularity 327, and reporting data format 328.

Figure 3:
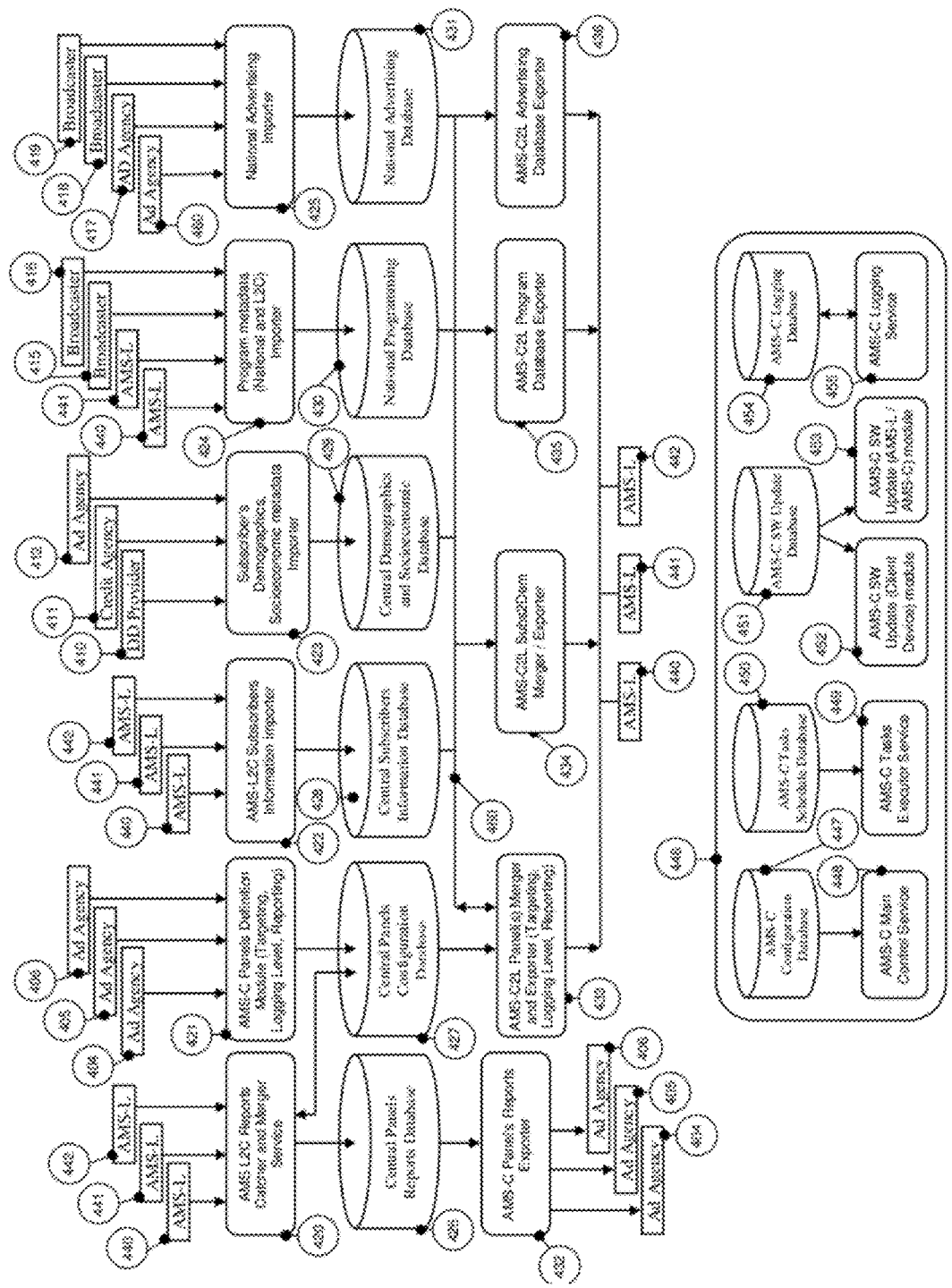
FIG. 3 depicts an embodiment of the AMS-C architecture and communication signal and data flow.

FIG. 3 depicts an embodiment of the AMS-C architecture and communication signal and data flow. AMS-C panels definition module 421 preferably receives from a client (e.g. ad agencies 404-406) panel definition attributes. Module 421 stores the information in a central panels configuration database 427. The panels merger and exporter module 433 maps the ad agency request to at least one AMS-L 440-442 based on information from a central subscriber information database 428 (which imports subscriber information 422 from, for example, the AMS-Ls 440-442), a central demographics and socioeconomic database 429 (which imports information demographic and socioeconomic data 423 from, for example, ad agencies 412, credit agencies 411, and other demographic providers 410), a national programming database 430 (which imports programming data 424 from, for example, AMS-Ls 440-441 and broadcasters 415-416), and/or a national advertising database 431 (which imports national advertising data 425 from, for example, ad agencies 460 and 417, and broadcasters 418-419). Module 443 generates and sends local panel definitions to applicable AMS-Ls 440-442.

The AMS reports catcher and merger service 420 preferably receives audience measurement reports from AMS-Ls 440-442, merges the reports according to the original panel definition parameters, and stores the merged reports in a central panel reports database 426. The AMS-C can export consolidated reports 432 to ad agencies 404-406 or allow the ad agencies 404-406 to have access to the reports upon request.

AMS-C2L (AMS-C to AMS-L) panel merger and exporter 433 sends panel definition parameters to the AMS-L subsystem. AMS-C2L program database exporter 435 sends filter program metadata to the AMS-L subsystem. AMS-C2L advertising database exporter 436 sends filtered and processed advertiser metadata to the AMS-L. AMS-C subsystem software module inventory 446 collects, processes, archives and sends panel report data to ad agencies.

Figure 4:
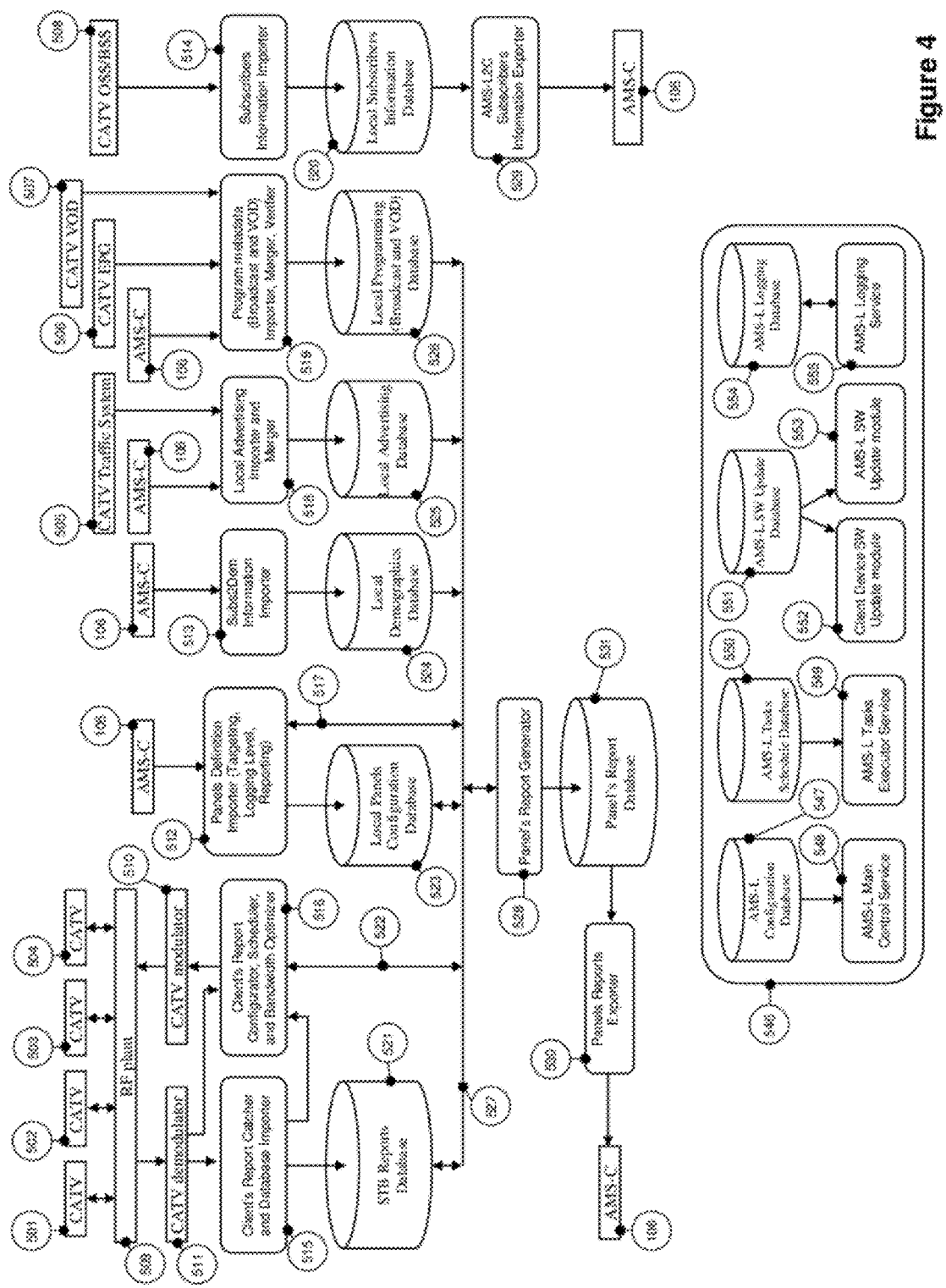
FIG. 4 depicts an embodiment of the AMS-L architecture and communication signal and data flow.

FIG. 4 depicts an embodiment of the AMS-L architecture and communication signal and data flow. Preferably, a panels definition importer module 512 receives panel definition attributes from the AMS-C module 106 and stores the definition attributes in a local panels configuration database module 523. Client report configurator, scheduler, and bandwidth optimizer module 516 can retrieve panel configuration parameters from module 523 and send configuration messages to appropriate client device models 501-504.

Module 516 can also monitor network upstream and downstream load and can load-balance upstream traffic from reporting client devices 501-504. Client report catcher and database importer module 515 preferably is responsible for receiving reports from client devices 501-504 and storing the reports in report database 521. Report generator module 528 receives set top box (STB) report records from each client device for each panel and can apply analytics criteria using, for example, local demographic information 524 (which can be imported 513 from an AMS-C 106), advertising information 525 (which can be imported 518 from AMS-C 106 or a CATV traffic system 505), and/or programming information 526 (which can be imported 519 from AMS-C 106, a CATV EPG server 506, or a CATV VOD 507). Module 528 stores the newly generated results in panel report database 531. Panel report exporter module 530 obtains the reports from database 531 and can export the reports to AMS-C 106 or allow access to the reports as requested.

AMS-L subsystem software module inventory 546 collects, processes, archives and sends panel report data to the AMS-C subsystem. Subscriber information importer 514 imports subscriber information from CATV OSS/BSS 508 and stores this information in local subscriber information database 520. AMS-L2C subscriber information exporter 529 exports subscriber information data to AMS-C 106

Figure 5:
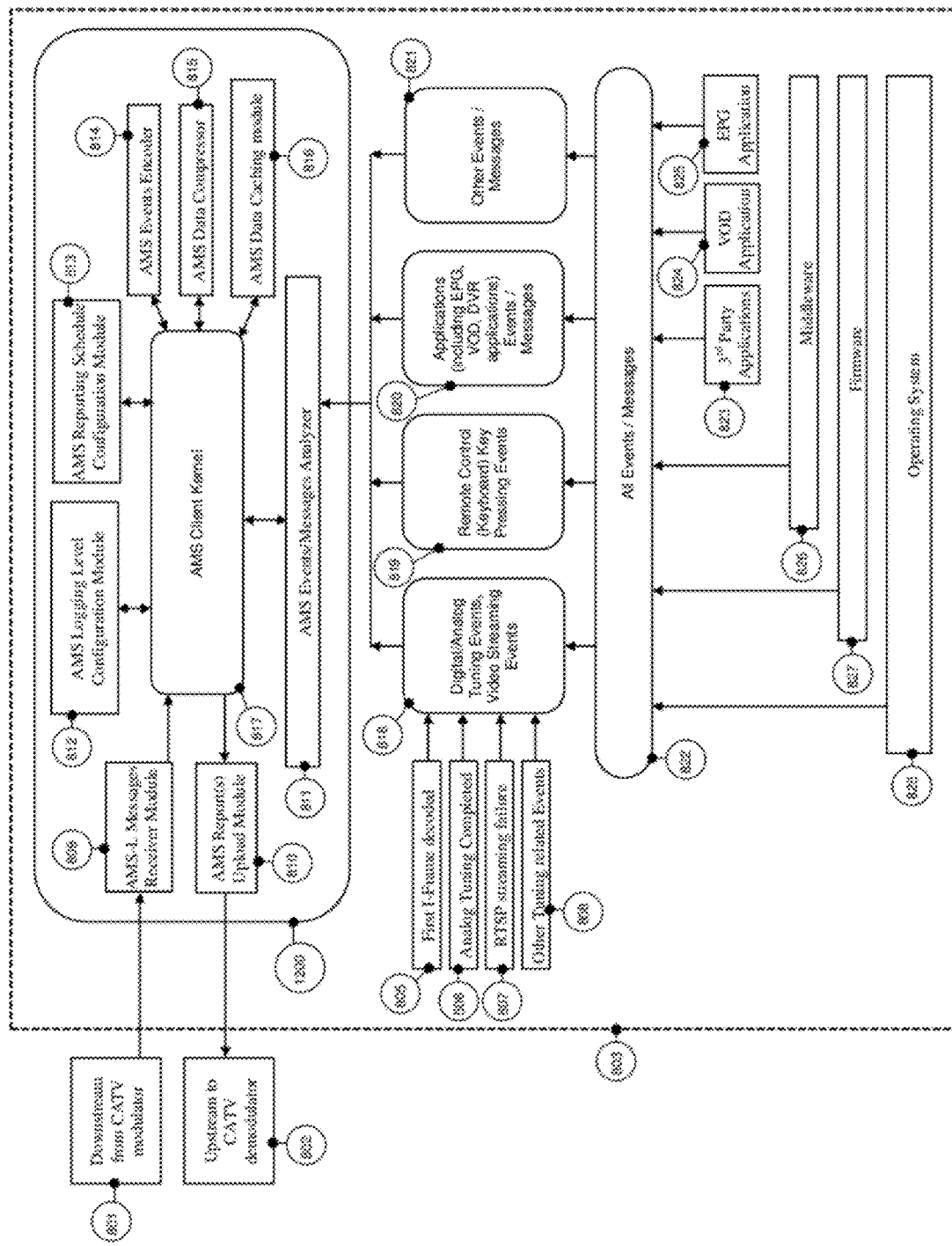
FIG. 5 depicts an embodiment of an AMS-A architecture and communication signal and data flow.

FIG. 5 depicts an embodiment of an AMS-A architecture and communication signal and data flow. Set top box (STB) 803 preferably contains AMS-A components module 1200. AMS-A client 1200 may consist of the following components: AMS-L messages receiver module 809, AMS report upload module 810, AMS kogging kevel configuration module 812, AMS reporting schedule configuration module 813, AMS events encoder 814, AMS data compressor 815, AMS data caching module 816, and AMS client kernel 817. AMS-L receive module gets panel configuration message from downstream 801 from the AMS-L subsystem. The client device preferably includes a central processing unit, memory, and software stack comprised of operating system 828, firmware 827, middleware 826, $3^{rd}$ party applications 823, VOD application 824, and EPG application 825. All these software modules generate events and messages 822 which may consist of the following categories: digital/analog tuning events, video streaming events 818, remote control key pressing events 819, applications events/messages 820, or other events/message 821. Events in category 818 preferably consists of the following sub-category events: first I frame decoded event 805, analog tuning completed event 806, RTSP streaming failure event 807, and other tuning related events 808.

Module 811 analyzes sequences and timing of the received messages in accordance with built-in algorithms to generate accurate and actual events which correspond to the viewer experience on a TV screen. Module 811 stores the generated events in AMS data caching module 816 for transport through AMS client kernel 817 and AMS report upload module 810 to AMS-L module 106. Module 811 preferably collects information from within STB 803 to estimate with negligible margin of error the actual events that took place on a TV set connected to the STP. Such events include, but are not limited to, what was viewed and how a viewer reacted to what was viewed, as described herein.

Figure 6:
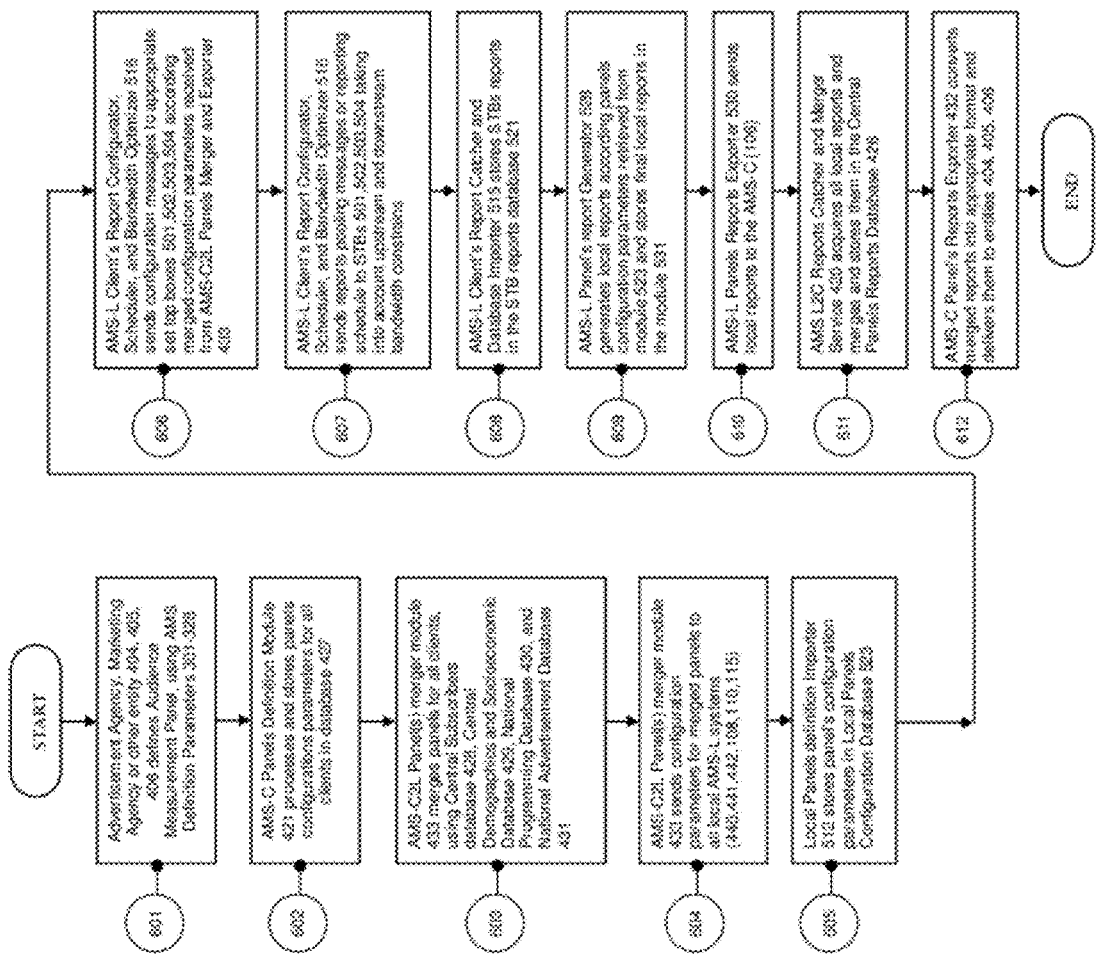
FIG. 6 depicts a flow chart of the overall system data and configuration data flow of an embodiment of an AMS.

FIG. 6 depicts a flow chart of the overall system data and configuration data flow of an embodiment of an AMS. At step 601, an advertisement agency, marketing agency, or other entity defines the audience measurement panel using AMS definition parameters. At step 602, an AMS-C panel definition module processes and stores the panel configuration parameters of all clients in a database. At step 603, the panels for all clients are merged using a central subscribers database, a central demographics and socioeconomic database, a national programming database, and/or a national advertisement database.

At step 604, the configuration parameters for the merged panels are sent to local AMS-L systems. At step 605, each AMS-L's local panel definition importer stores the panel's configuration parameters in a local panel configuration database. At step 606, each AMS-L's client report configurator, scheduler, and bandwidth optimizer sends configuration messages to appropriate STBs according to the merged configuration parameters received from the AMS-C. At step 607, each AMS-L's client report configurator, scheduler, and bandwidth optimizer sends reports pulling messages or reporting schedules to the STBs, taking into account upstream and downstream bandwidth constraints.

At step 608, each AMS-L's client report catcher and database importer stores the STB reports in the STB report database. At step 609, each AMS-L's panel report generator generates local reports according to the panel configuration parameters retrieved from the database and stores the compiled local reports in a panel report database. At step 610, each AMS-L's panel report exporter sends the local reports to the AMS-C. At step 611, all local reports from each of the AMS-Ls are merged and stored in a central panel report database. At step 612, the AMS-C's panel report exporter converts the merged reports into an appropriate format and delivers the reports to the panel requesters.

Figure 7:
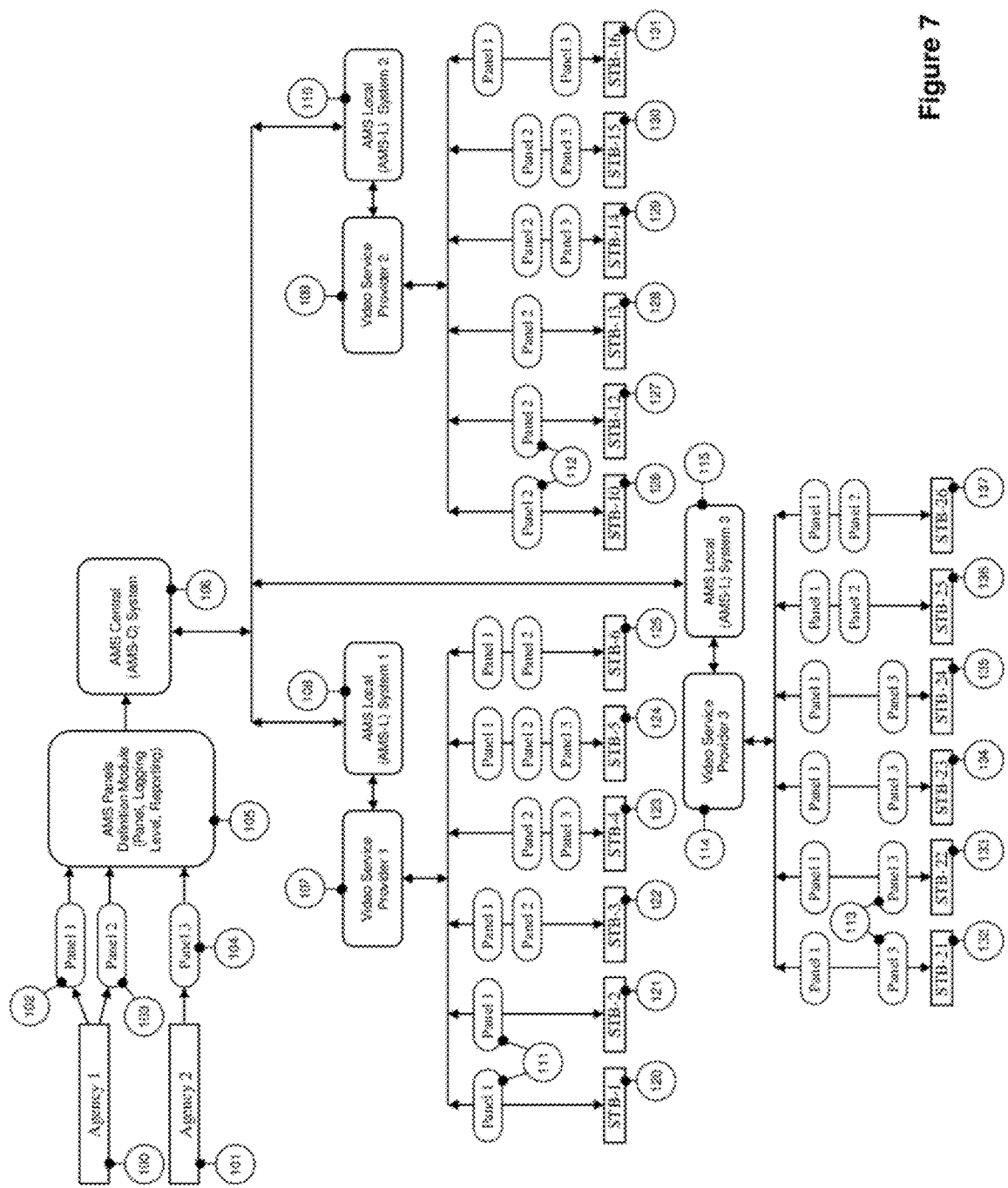
FIG. 7 depicts an embodiment of dynamic distribution of panel assignments among client devices for multiple video services providers.

The AMS can be configured to monitor one panel at a time or multiple panels at once. FIG. 7 depicts an embodiment of dynamic distribution of panel assignments among client devices for multiple video services providers 107, 109, and 114. For example, AMS panel definition module 105 of AMS-C 106 can receive requests from multiple ad agencies 100 and 101 for multiple panel requests 102-104. AMS-C 106 can map panel requests to multiple video services providers 107, 109, and 114 via AMS-Ls 108, 110, and 115, respectively. AMS-Ls 108, 110, and 115 generate and send appropriate configuration messages based on the input received from AMS-C 106 to each STB 120-137. The configuration messages may include combinations of outstanding panel requests depending on the request definitions. For example, STB 120 can be configured to collect data to fulfill the needs of Panel 1, while STB 122 can be configured to collect data to fulfill the needs of Panel 1 and Panel 2, while STB 130 can be configured to collect data to fulfill the needs of Panel 1 and Panel 3.

Figure 8:
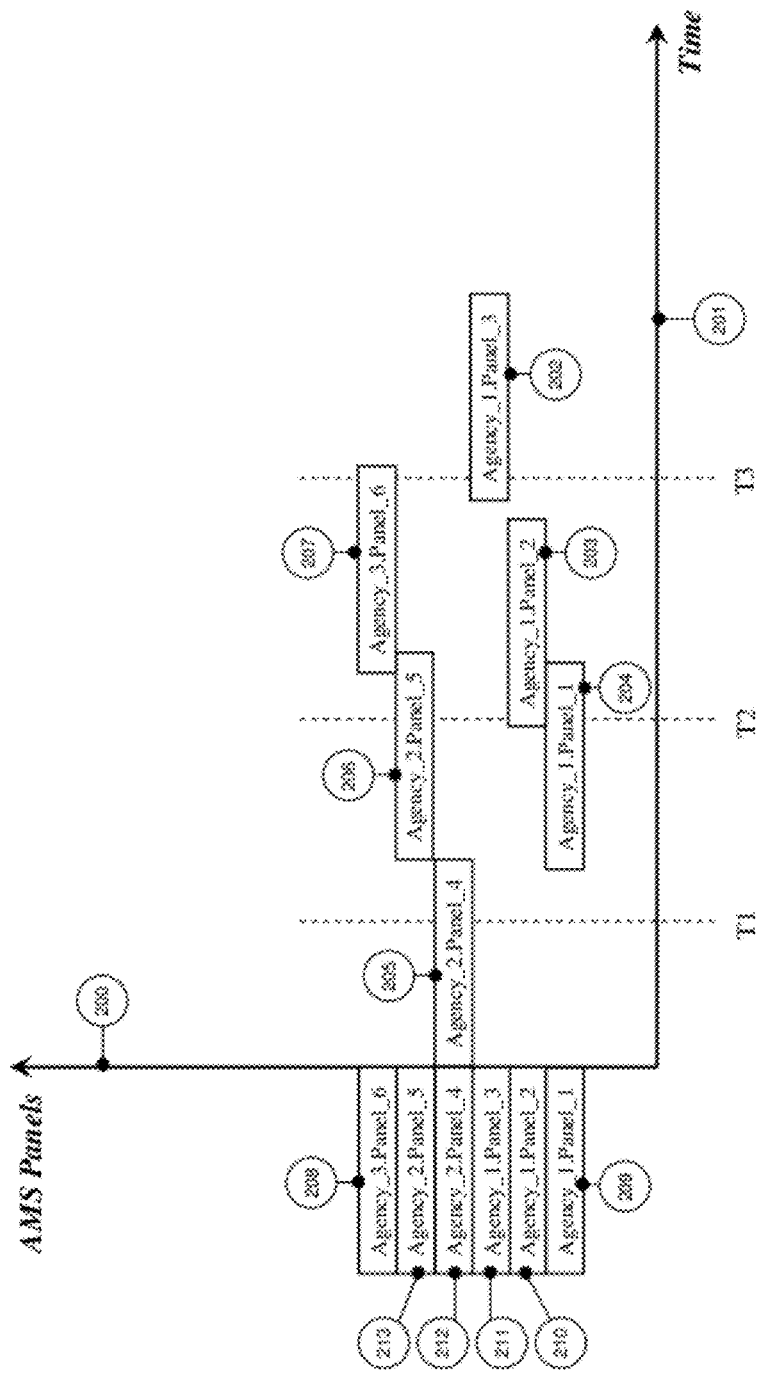
FIG. 8 depicts an embodiment of the AMS's ability to collect data from multiple panels overlapping in time.

FIG. 8 depicts an embodiment of the AMS's ability to collect data from multiple panels overlapping in time. In the example shown in FIG. 8, at time T1, the system may collect data specified in Panel 4 from Ad Agency 2, while at time T2, the system may collect data specified in Panel 1 from Ad Agency 1, Panel 5 from Ad Agency 2, and Panel 2 from Ad Agency 1, and at time T3, the system may collect data specified in Panel 6 from Ad Agency 3 and Panel 3 from Ad Agency 1.

Returning to FIG. 1, in certain embodiments, the display device 1215 can alter the playback of the content based on viewer conditions sensed by the sensors 1212. For example, if a motion detector determines that there is nobody present to watch an ad, the display device 1215 can increase the volume of the advertisement or switch to an advertisement that is more effective to a listener as opposed to a viewer (e.g. a radio commercial) incase the viewer is still in the hearing range. For another example, if a sensor determines that a viewer's breathing or pulse has slowed, possibly indicating that the viewer has fallen asleep, the display device 1215 may turn off and the AMS-A 1200 may stop recording.

While the examples provided herein are for TV viewing systems, the invention is also applicable to other video and audio applications involving an audience, including, but not limited to, video viewing on PCs, tablets, smart phones, game consoles, radio receivers, MP3 players, and other streaming and linear programming devices. Furthermore, the invention is equally applicable to the monitoring of other electronic devices in the environment of an audience member, such as other home appliances.

Although the exemplary environment described herein employs a hard disk database, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A dynamic television audience measurement system (AMS), comprising:
a central level AMS sub-system;
a local node level AMS sub-system in communication with the central level AMS subsystem;
a plurality of client device level AMS sub-systems, each client device level AMS sub-system in communication with the local node level AMS sub-system, a client device, and a display device; and
a plurality of display devices, wherein each display device is monitored by a client level AMS sub-system, wherein the central level AMS sub-system receives panel definitions from panel requestors, merges the panel definitions, transmits the merged panel definitions to at least one local node level AMS sub-system, receives merged viewership report from the at least one local node level AMS sub-system comprising asynchronously collected monitoring criteria, and recombines at least a portion of the asynchronously collected monitoring criteria into at least one consolidated report for each panel requestor,
wherein the local node level AMS sub-system receives merged panel definitions from the central level AMS sub-system, generates client level specific configurations messages for at least a portion of the plurality of client level AMS subsystems according to the merged panel definitions, transmits configuration messages to a portion of the plurality of client level AMS sub-systems, receives viewership reports comprising the asynchronously collected monitoring criteria from at least a portion of the client level AMS sub-systems, merges at least a portion of the asynchronously collected monitoring criteria into a merged viewership report for at least one received merged panel definition, transmits the merged viewership report to the central level AMS sub-system, monitors upstream and downstream loads, and optimizes bandwidth based on the monitored upstream and downstream loads; and wherein each of the plurality of client level AMS sub-systems receives client level specific configurations messages from the local node level AMS sub-system according to the merged panel definitions, asynchronously collects information from both the client device and the display device for at least one configuration message, compiles the viewership reports comprising the asynchronously collected monitoring criteria as the information collected from both the client device and the display device for at least one client level specific configurations message, and transmits the viewership report to the local node level AMS sub-system.

2. The dynamic television audience measurement system of claim 1, wherein the central level AMS sub-system is maintained by a broadcaster, pay TV service operator, broadband TV service operator, or advertisement agency.

3. The dynamic television audience measurement system of claim 1, wherein the local node level AMS sub-system is maintained by a cable company, a satellite TV company, a broadband TV company, or an internet service provider.

4. The dynamic television audience measurement system of claim 1, wherein each client level AMS sub-system is stored on a set top box, a TV, a computer, a tablet, a smartphone, or a streaming media device.

5. The dynamic television audience measurement system of claim 1, wherein the panel definitions comprise criteria to be monitored by each client level AMS subsystem.

6. The dynamic television audience measurement system of claim 5, wherein the criteria to be monitored are chosen from the group comprising target audience, media content, data to be collected, schedule for data collection, and rate of data collection.

7. The dynamic television audience measurement system of claim 6, wherein the target audience comprises at least one of viewer location, viewer demographic characteristics, viewer social characteristics, viewer socioeconomic characteristics, viewer housing characteristics, and viewer purchasing profile characteristics.

8. The dynamic television audience measurement system of claim 6, wherein the media content comprises at least one of the source of the content, the advertisements displayed, the programs displayed, the channels, and the media packages purchased.

9. The dynamic television audience measurement system of claim 6, wherein the data to be collected is chosen from at least one of remote control button presses, messages and events received from client device, and messages and events received from rendering device.

10. The dynamic television audience measurement system of claim 6, wherein the schedule for data collection comprises at least one of start date and time, end date and time, and recurrence of data collection.

11. The dynamic television audience measurement system of claim 6, wherein the rate of data collection comprises at least one of reporting frequency, reporting granularity, and format of the reporting data.

12. The dynamic television audience measurement system of claim 5, wherein the central level AMS sub-system obtains and stores at least one of subscriber information, demographic information, socioeconomic data, national programming schedules, and national advertising data.

13. The dynamic television audience measurement system of claim 12, further comprising multiple a local node level AMS sub-systems, wherein the central level AMS subsystem determines which local node level AMS sub-systems to transmit the panel definitions to based on the criteria to be monitored and the data stored at the central level AMS sub-system.

14. The dynamic television audience measurement system of claim 13, wherein the central level AMS sub-system compiles the merged viewership reports from each local node level AMS sub-system.

15. The dynamic television audience measurement system of claim 13, wherein the local node level AMS sub-system determines which of the plurality of plurality of client level AMS sub-systems to transmit the panel definitions to based on the criteria to be monitored and the data stored at the central level AMS sub-system.

16. The dynamic television audience measurement system of claim 1, wherein at least one of a broadcaster subsystem and a service provider subsystem couples an identifier (ID) to at least one of a program or an advertisement.

17. The dynamic television audience measurement system of claim 16, wherein the ID is at least one of ISCI, Ad-ID, UMID, ISAN, V-ISAN, ADI, or TID.

18. The dynamic television audience measurement system of claim 16, wherein at least one of the broadcaster subsystem and the service provider sub-system couples metadata to at least one of a program or an advertisement.

19. The dynamic television audience measurement system of claim 18, wherein the metadata comprises at least one of a start flag or an end flag.

20. The dynamic television audience measurement system of claim 16, wherein each client level AMS sub-system monitors and records events based on the panel definitions.

21. The dynamic television audience measurement system of claim 20, wherein the monitored events are at least one of channel watched, program watched, advertisement watched, remote control button pressed, viewer's brainwaves, viewer's body movements, viewer's speech, and changes in viewer's pupil size, temperature, pulse rate, perspiration, breathing, or blood pressure.

22. The dynamic television audience measurement system of claim 20, wherein the events are recorded with the ID of the program or advertisement that is being viewed at the time of the event.

23. The dynamic television audience measurement system of claim 20, wherein the client level AMS sub-system adjusts the playback of the content based on the monitored events.

24. The dynamic television audience measurement system of claim 23, wherein the adjustments to the playback of the content are chosen from changing the volume and turning off the display device.

25. A method of dynamically measuring a television audience with
an audience measurement system (AMS), comprising:
receiving panel definitions from panel requestors at a central level AMS sub-system;
merging the panel definitions at the central level AMS sub-system;
transmitting the merged panel definitions from the central level AMS sub-system to at least one local node level AMS sub-system;
receiving the merged panel definitions at local node level AMS sub-system;

generating client level specific configurations messages for at least a portion of the plurality of client level AMS sub-systems according to the merged panel definitions, transmitting configuration messages according from the local node level AMS sub-system to a plurality of client level AMS sub-systems according to the merged panel definitions;

monitoring upstream and downstream load and optimizing bandwidth based on the monitored upstream and downstream load at the local node level AMS subsystem;

receiving at each of the client level AMS subsystem client level specific configurations messages from the local node level AMS subsystem according to the merged panel definitions;

asynchronously collecting information from both a client device and a display device coupled to each client level AMS sub-system for at least one client level specific configurations message;

compiling a viewership report comprising asynchronously collected monitoring criteria as the information collected from both the client device and the display device for at least one client level specific configurations message at each of the client level AMS subsystems;

transmitting each of the viewership reports from the client level AMS sub-systems to the local node level AMS sub-system;

receiving the viewership reports comprising the asynchronously collected monitoring criteria at the local node level AMS sub-system;

merging at least a portion of the asynchronously collected monitoring criteria into a merged viewership report for at least one received merged panel definition at the local node level AMS sub-system;

transmitting the merged viewership report from the local node level AMS sub-system to the central level AMS sub-system;

receiving the merged viewership report at the central level AMS subsystem; and recombining at least a portion of the asynchronously collected monitoring criteria into at least one consolidated report for each panel requestor at the central level AMS subsystem.

26. The method claim 25, wherein the central level AMS sub-system is maintained by a broadcaster, pay TV service operator, broadband TV service operator, or advertisement agency.

27. The method of claim 25, wherein the local node level AMS sub-system is maintained by a cable company, a satellite TV company, a broadband TV company, or an internet service provider.

28. The method of claim 25, wherein each client level AMS sub-system is stored on a set top box, a TV, a computer, a tablet, a smartphone, or a streaming media device.

29. The method of claim 25, wherein the panel definitions comprise criteria to be monitored by each client level AMS sub-system.

30. The method of claim 29, wherein the criteria to be monitored are chosen from the group comprising target audience, media content, data to be collected, schedule for data collection, and rate of data collection.

31. The method of claim 30, wherein the target audience comprises at least one of viewer location, viewer demographic characteristics, viewer social characteristics, viewer socioeconomic characteristics, viewer housing characteristics, and viewer purchasing profile characteristics.

32. The method of claim 30, wherein the media content comprises at least one of the source of the content, the advertisements displayed, the programs displayed, the channels, and the media packages purchased.

33. The method of claim 30, wherein the data to be collected is chosen from at least one of rate of data collection, remote control button presses, messages and events received from client device, and messages and events received from rendering device.

34. The method of claim 30, wherein the schedule for data collection comprises at least one of start date and time, end date and time, and recurrence of data collection.

35. The method of claim 30, wherein the rate of data collection comprises at least one of reporting frequency, reporting granularity, and format of the reporting data.

36. The method of claim 29, wherein the central level AMS sub-system obtains and stores at least one of subscriber information, demographic information, socioeconomic data, national programming schedules, and national advertising data.

37. The method of claim 36, wherein there are multiple local node level AMS sub-systems, further comprising the central level AMS sub-system determining which local node level AMS sub-systems to transmit the panel definitions to based on the criteria to be monitored and the data stored at the central level AMS sub-system.

38. The method of claim 37, further comprising the central level AMS subsystem compiling the merged viewership reports from each local node level AMS subsystem.

39. The method of claim 37, further comprising the local node level AMS subsystem determining which of the plurality of plurality of client level AMS subsystems to transmit the panel definitions to based on the criteria to be monitored and the data stored at the central level AMS sub-system.

40. The method of claim 25, further comprising at least one of a broadcaster subsystem and a service provider subsystem coupling an identifier (ID) to at least one of a program or an advertisement.

41. The method of claim 40, wherein the ID is at least one of ISCI, Ad-ID, UMID, ISAN, V-ISAN, ADI, or TID.

42. The method of claim 40, further comprising at least one of the broadcaster subsystem and the service provider subsystem coupling metadata to at least one of a program or an advertisement.

43. The method of claim 42, wherein the metadata comprises at least one of a start flag or an end flag.

44. The method of claim 40, wherein each client level AMS sub-system monitors and records events based on the panel definitions.

45. The method of claim 44, wherein the monitored events are at least one of channel watched, program watched, advertisement watched, remote control button pressed, viewer's brainwaves, viewer's body movements, viewer's speech, and changes in viewer's pupil size, temperature, pulse rate, perspiration, breathing, or blood pressure.

46. The method of claim 44, wherein the events are recorded with the ID of the program or advertisement that is being viewed at the time of the event.

47. The method of claim 44, further comprising the client level AMS subsystem adjusting the playback of the content based on the monitored events.

48. The method of claim 47, wherein the adjustments to the playback of the content are chosen from changing the volume and turning off the display device.

* * * * *